(12) United States Patent
Lu et al.

(10) Patent No.: US 11,999,064 B2
(45) Date of Patent: Jun. 4, 2024

(54) EXCAVATION LEARNING FOR RIGID OBJECTS IN CLUTTER

(71) Applicant: Baidu USA, LLC, Sunnyvale, CA (US)

(72) Inventors: Qingkai Lu, Santa Clara, CA (US); Liangjun Zhang, Cupertino, CA (US)

(73) Assignee: Baidu USA LLC, Sunnyvale, CA (US)

( * ) Notice: Subject to any disclaimer, the term of this patent is extended or adjusted under 35 U.S.C. 154(b) by 94 days.

(21) Appl. No.: 17/380,589

(22) Filed: Jul. 20, 2021

(65) Prior Publication Data
US 2023/0036849 A1    Feb. 2, 2023

(51) Int. Cl.
*B25J 9/16* (2006.01)
*B25J 13/08* (2006.01)
*G06N 3/08* (2023.01)
*G06T 17/10* (2006.01)

(52) U.S. Cl.
CPC ............ *B25J 9/1664* (2013.01); *B25J 9/161* (2013.01); *B25J 9/1697* (2013.01); *B25J 13/08* (2013.01); *G06N 3/08* (2013.01); *G06T 17/10* (2013.01); *G06T 2210/61* (2013.01)

(58) Field of Classification Search
CPC ........ B25J 9/1664; B25J 9/161; B25J 9/1697; B25J 13/08; G06N 3/08; G06N 3/045; G06T 17/10; G06T 2210/61; E02F 3/437; E02F 9/262; E02F 9/265; G06F 18/241
See application file for complete search history.

(56) References Cited

U.S. PATENT DOCUMENTS 11,100,669 B1 * 8/2021 Zhou ............... G01S 13/867
2020/0394813 A1 * 12/2020 Theverapperuma ............
                                                    G06F 18/2431

OTHER PUBLICATIONS

Q. Lu, M. Van der Merwe, B. Sundaralingam and T. Hermans, "Multi-fingered grasp planning via inference in deep neural networks", IEEE Robot. Automat. Mag., vol. 27, No. 2, pp. 55-65, Jun. 2020 (Year: 2020).*
Levine, Sergey, et al. "Learning Hand-Eye Coordination for Robotic Grasping with Deep Learning and Large-Scale Data Collection." arXiv preprint arXiv:1603.02199 (2016) (Year: 2016).*
(Continued)

*Primary Examiner* — Adam R Mott
*Assistant Examiner* — Matthew C Gammon
(74) *Attorney, Agent, or Firm* — NORTH WEBER & BAUGH LLP

(57) ABSTRACT

Embodiments of a learning-based excavation planning method are disclosed for excavating rigid objects in clutter, which is challenging due to high variance of geometric and physical properties of objects, and large resistive force during the excavation. A convolutional neural network is utilized to predict a probability of excavation success. Embodiments of a sampling-based optimization method are disclosed for planning high-quality excavation trajectories by leveraging the learned prediction model. To reduce simulation-to-real gap for excavation learning, voxel-based representations of an excavation scene are used. Excavation experiments were performed in both simulation and real world to evaluate the learning-based excavation planners. Experimental results show that embodiments of the disclosed method may plan high-quality excavations for rigid objects in clutter and outperform baseline methods by large margins.

19 Claims, 28 Drawing Sheets

(56) References Cited

OTHER PUBLICATIONS

C. Schenck, J. Tompson, S. Levine and D. Fox, "Learning robotic manipulation of granular media", Proc. Conf. Robot Learn., pp. 239-248, 2017 (Year: 2017).*
Singh, Sanjiv. Synthesis of Tactical Plans for Robotic Excavation. Diss. Carnegie Mellon University, 1995 (Year: 1995).*
Lu, Qingkai, et al. "Planning Multi-Fingered Grasps as Probabilistic Inference in a Learned Deep Network." arXiv preprint arXiv:1804.03289 (2018) (Year: 2018).*
Q. Lu et al.,"Excavation Learning for Rigid Objects in Clutter," arXiv preprint arXiv:2107.04171, Jul. 9, 2021. (13 pgs).
Yang et al., "Optimization-based framework for excavation trajectory generation," arXiv preprint arXiv:2010.14038, 2020. (9 pgs).
Tripicchio et al., "A stereo-panoramic telepresence system for construction machines," Procedia Manufacturing, vol. 11, pp. 1552-1559, 2017. (8pgs).
Tanzini et al., "A novel human-machine interface for working machines operation," in 2013 IEEE Ro-Man. IEEE, 2013, pp. 744-750. (7pgs).
Fernando et al., "Iterative learning-based admittance control for autonomous excavation," Journal of Intelligent & Robotic Systems, vol. 96, No. 3, 2019. (15pgs).
Dobson et al., "Admittance control forrobotic loading: Design and experiments with a 1-tonne loader and a 14-tonne load-haul-dump machine," Journal of Field Robotics, vol. 34,No. 1, 2017.(15pgs).
Marshall et al., "Toward autonomous excavation of fragmented rock: full-scale experiments," IEEE Transactions on Automation Science and Engineering, vol. 5, No. 3, 2008. (7pgs).
Jud et al., "Autonomous freeform trenching using a walking excavator," IEEE Robotics & Automation Letters, vol. 4, No. 4, 2019. [Abstract Only] (4pgs).
Maeda et al., "Combined ILC & disturbance observer for the rejection of near-repetitive disturbances, with application to excavation," IEEE Transactions on Control Systems Technology, vol. 23, No. 5, 2015. [Abstract Only] (4pgs).
Clarke et al., "Learning audio feedback for estimating amount and flow of granular material," Proceedings of Machine Learning Research, vol. 87, 2018. (22pgs).
Lu et al., "Multi-fingered grasp planning via inference in deep neural networks," IEEE Robotics & Automation Magazine, 2020. (9pgs).
Halbach et al., "Neural network pile loading controller trained by demonstration," in 2019 International Conference on Robotics and Automation (ICRA), IEEE, 2019.[Abstract] (2p).
Sandzimier et al., "A data-driven approach to predictionand optimal bucket-filling control for autonomous excavators," IEEE Robotics & Automation Letters, vol. 5(2), 2020.(9pgs.
Jetchev et al., "Trajectory prediction in cluttered voxel environments," in 2010 IEEE International Conference on Robotics and Automation. IEEE, 2010. (6pgs).
Yang et al., "Compact reachability map for excavator motion planning," in IEEE/RSJ Intl.Conf. on Intelligent Robots and Systems. IEEE, 2019. [Abstract Only] (4pgs).
He et al., "Deep residual learning for image recognition," arXiv preprint arXiv:1512.03385, 2015. (12pgs).
Varley et al., "Shape completion enabled robotic grasping," arXiv preprint arXiv:1609.08546, 2017. (8pgs).
P.-T. De Boer et al., "A tutorial on the cross-entropy method," Annals of operations research, vol. 134, No. 1, 2005. (47pgs).
Fankhauser et al., "A Universal Grid Map Library: Implementation & Use Case for Rough Terrain Navigation," in Robot Operating System (ROS), 2016. (22 pgs).
S. Sing, "Synthesis of tactical plans for robotic excavation," Ph.D. dissertation, Carnegie Mellon University, 1995. (185 pgs).
Stentz et al., "A Robotic Excavator for Autonomous Truck Loading," Autonomous Robots, vol. 7, No. 2, 1999. (9pgs).
Jud et al., "Planning and control for autonomous excavation," IEEE Robotics and Automation Letters, vol. 2, No. 4, 2017. [Abstract Only] (5 pgs).
Marsh et al., "Trends of occupational fatalities involving machines, United States, 1992-2010," Am J Ind Med, 2015. (23pgs).
Wang et al., "Design, strategies, & issues towardsan augmented reality-based construction training platform," Journal of information technology in construction, (ITcon), vol. 12, No. 25, 2007. (18 pgs).
Hemami et al., "An overview of autonomous loading of bulk material," in 26th International Symposium on Automation & Robotics in Construction, 2009. (7pgs).
Dadhich et al., "Key challenges in automation of earth-moving machines," Automation in Construction, vol. 68, 2016. (27 pgs).
Mascaro et al., "Towards automating construction tasks: Large-scale object mapping, segmentation, and manipulation," Journal of Field Robotics, 2020. (24 pgs).
Seo et al., "Task planner design for an automated excavation system," Automation in Construction, vol. 20, No. 7, 2011. [Abstract Only] (6pgs).
Chang et al., "A straight-line motion tracking control of hydraulic excavator system," Mechatronics, vol. 12, No. 1, 2002. [Abstract Only](5 pgs).
Sotiropoulos et al., "A model-free extremum-seeking approach to autonomous excavator control based on output power maximization," IEEE Robotics and Automation Letters, vol. 4, No. 2, 2019. (9pgs).
Sotiropoulos et al., "Autonomous excavationof rocks using a gaussian process model and unscented kalman filter," IEEE Robotics & Automation Letters, vol. 5, No. 2, 2020.(8 pgs).
Finn et al., "Deep visual foresight for planning robot motion," arXiv preprint arXiv:1610.00696, 2017. (8pgs).
Levine et al., "Learning hand-eye coordination for robotic grasping with deep learning and large-scale data collection," The International Journal of Robotics Research, vol. 37, No. 4-5, pp. 421-436, 2018. (16pgs).
Lu et al., "Planning Multi-Fingered Grasps as Probabilistic Inference in a Learned Deep Network," arXiv preprint arXiv:1804.03289, 2018. (16pgs).
Lenz et al., "Deep learning for detecting robotic grasps," arXiv preprint arXiv:1301.3592, 2014. (17pgs).
Schenck et al., "Learning robotic manipulation of granular media," in Conference on Robot Learning, 2017. (10pgs).
Xu et al., "Learning 3d dynamic scene representations for robot manipulation," arXiv preprint arXiv:2011.01968, 2020. (17pgs).

* cited by examiner

Azure RGB image in real world

RGB image of one excavation scene in simulation

800

1210

1220

*1320*

1360

EXCAVATION LEARNING FOR RIGID OBJECTS IN CLUTTER

BACKGROUND

A. Technical Field

The present disclosure relates generally to systems and methods for computer learning that can provide improved computer performance, features, and uses. More particularly, the present disclosure relates to systems and methods for autonomous excavation learning and planning.

B. Background

Deep neural networks have achieved great successes in many domains, such as computer vision, natural language processing, and recommender systems, etc.

Excavators are widely used in various applications, including construction, material loading, and mining. Automating the excavator operation has been an active area of research because of its potential to increase safety, reduce cost and improve the work efficiency. Excavators may need to operate in extreme environments or weather conditions, which are challenging for human operators. Occupational machine-related fatalities and injuries occur each year. Furthermore, operating excavators requires special and costly training to ensure safe operations of equipment.

In terms of developing autonomous excavator systems, there have been many efforts that focus on particular aspects, including perception, planning, control, teleoperation, and system integration and applications. Despite these advances, autonomous excavation for hard or compact materials, especially irregular rigid objects, remains challenging, and relatively few works have looked at this problem. Rock excavations are typical scenarios in mining job sites. As compared to granular materials, the rocks are hard and often formed in clutter. It is more challenging, more time consuming, and much more expensive to excavate. Excavation of rocks results in a large resistive force to the bucket. Furthermore, unlike granular materials composited by uniform particles, rigid objects often have high variance of geometrical shapes (e.g., concave and convex), appearances, and physics properties (e.g., mass), which largely increases the challenges for robotic perception and manipulation.

Accordingly, what is needed are systems and methods for autonomous excavation learning and planning, especially for rigid objects in clutter.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
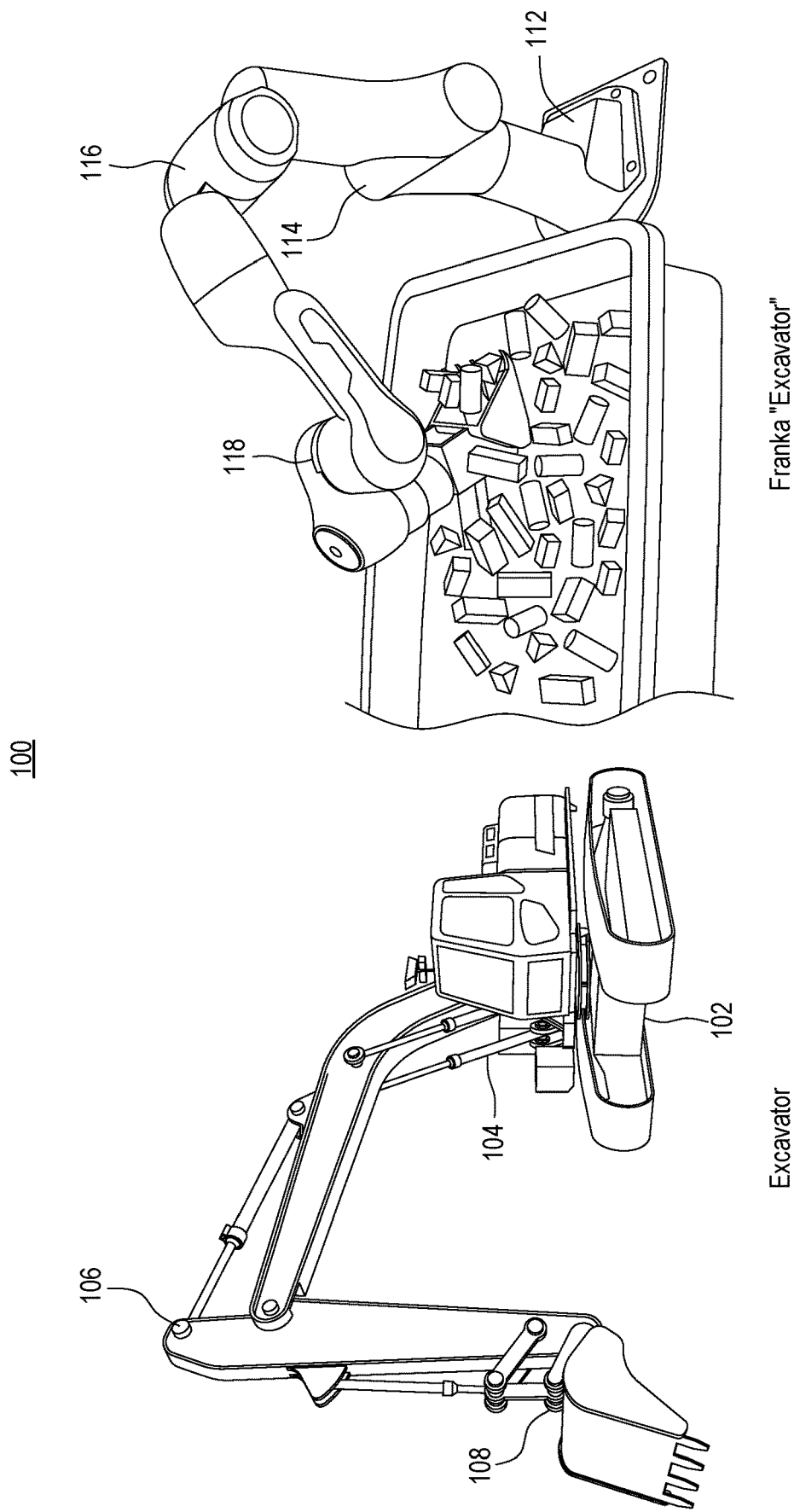
FIG. 1 depicts mechanical structure of an excavator and a Franka arm "excavator" with a three-dimensional (3D) printed bucket, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms, and any lists of items that follow are example items and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); (5) an acceptable outcome has been reached; and (6) all of the data has been processed.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of autonomous excavation, aspects of the present disclosure are not so limited. Accordingly, aspects of the present disclosure may be applied or adapted for use in other autonomous construction vehicles or machines.

A. General Introduction

Excavators are widely used in various applications, including construction, material loading, and mining. Automating the excavator operation has been an active area of research because of its potential to increase safety, reduce cost and improve the work efficiency. Excavators may need to operate in extreme environments or weather conditions, which are challenging for human operators. Occupational machine-related fatalities and injuries occur each year. Furthermore, excavator operation requires special and costly training to ensure safe operations of equipment.

In terms of developing autonomous excavator systems, there have been many efforts that focus on particular aspects, including perception, planning, control, teleoperation, and system integration and applications. Despite these advances, autonomous excavation for hard or compact materials, especially irregular rigid objects, remains challenging and relatively few works have looked at this problem. Rock excavations are typical scenarios in mining job sites. As compared to granular material, the rocks are hard and often formed in clutter. It is more challenging, more time consuming, and much more expensive to excavate. Excavation of rocks results in a large resistive force to the bucket. Furthermore, unlike granular materials composited by uniform particles, rigid objects often have high variance of geometrical shapes (e.g., concave and convex), appearances, and physics properties (e.g., mass), which largely increases the challenges for robotic perception and manipulation. In one or more embodiments, rigid objects are defined as objects that are not deformable during excavation operation.

In the present patent document, embodiments of excavation learning and planning for irregular rigid objects in clutter are disclosed. Various deep learning methods are employed to tackle the challenges in excavation problems for rigid objects in clutter. Given the visual representation of the excavation scene, a high-quality trajectory is planned to excavate objects with large total volume per excavation. Presented herein are novel RGBD and voxel-based convolutional neural network (CNN) models for predicting excavation success. A large set of training excavation samples was collected in simulation to train the prediction network. Excavation planning was then formulated as an optimization problem leveraging the learned prediction models. Excavation experiments were performed in both simulation and real world to evaluate embodiments of the learning-based excavation methods. Excavation experiment results in simulation and real world show that embodiments of the learning-based planners are able to generate excavations with high success rates. The experimental results also demonstrate the advantages of the learning-based excavation planners over two heuristic planners.

In summary, some of the main contributions of the present patent document include but are not limited to:
(1) Two CNN models are presented for success prediction of a new task, excavation for rigid objects in clutter, and excavation planning is solved as an optimization problem leveraging the learned models.
(2) Excavation experiments in simulation and real-world show that embodiments of the disclosed learning-based planner embodiments are able to generate excavation trajectories with a high success rate.
(3) Embodiments represent excavation trajectories in task space, which allows the transfer of the learned excavation prediction models across different hardware platforms.
(4) The present patent document demonstrates that the voxel-grid representation of the excavation scene reduces simulation-real gap for excavation learning, compared with the RGBD image representation.
(5) An excavation dataset is collected for cluttered rigid objects.

Some related work is summarized in Section B. In Section C, the excavation planning problem is defined for cluttered rigid objects. This is followed in Section D with an overview of various embodiments to excavation learning and planning. A thorough account of simulated and real-robot experiments is provided in Section E. In Section F, excavation data collection, model training, offline validation, further results analysis, and ablation study are presented. Some conclusions or observations are given in Section G.

B. Some Related Work

In this section, some literature of autonomous excavators, manipulation learning, and voxel-based planning are summarized.

1. Autonomous Excavators

Prior work on developing autonomous excavators mainly focuses on soil excavation and granular material handling. Some proposed a prototype system for autonomous material loading to dump trucks. A system for autonomous trenching has been presented and validated on a real excavator. Some proposed a trajectory optimization method for granular material excavation. Recently, various prototypes and experiments have been carried out on the task planning for large-scale excavation tasks, e.g., soil pile removals. Some presented a novel real-time panoramic telepresence system for construction machines. Others discussed a novel approach for interactive operation of working machines. A reinforcement learning approach for automated arm control of a hydraulic excavator has also been proposed.

Different control approaches have been proposed for excavation automation. Some proposed a control structure with explicit disturbance compensation for soil excavation. Others presented a force control method and the resulting bucket motions can be adaptive to different terrain. A straight-line motion tracking control scheme for hydraulic excavator system has been proposed. Others presented a model-free extremum-seeking approach using power maximization.

There are relatively few works related to rigid objects excavation. An iterative learning-based admittance control algorithm for autonomous excavation in fragmented rock using robotic wheel loaders has been developed. Some discussed an admittance-based Autonomous Loading Controller for fragmented rock excavation. Compared with some previous low-level excavation control work, embodiments of the present document focus on learning-based excavation trajectory planning that considers visual scene representation of cluttered rigid objects. Some integrated a Gaussian Process rock motion model and an Unscented Kalman filter for rock excavation. However, such an approach only focuses on excavation for a single rock of isolation and uses an OptiTrack motion capture system to track the motion of the rock. In comparison, one or more embodiments of the present document focus on excavation for rigid objects in clutter using a RGBD camera.

2. Deep Learning for Manipulation

In recent years, researchers have looked into capitalizing on the success of deep learning to improve robotic manipulation, including non-prehensile manipulation, grasping, and granular material scooping. For example, deep learning has shown to generalize well to previously unseen objects where only partial-view visual information is available for grasping. Some trained an end-to-end Neural Network controller for automated pile loading of granular media using human demonstration data. Some used a learned statistical model to predict the behavior of soil excavation, and the prediction model is built for controlling the amount of excavated soil. In the present patent document, in one or more embodiments, deep learning is applied to tackle the perception and manipulation challenges of excavation for cluttered rigid objects and to generate high-quality excavations.

Various planning approaches have been developed to leverage deep neural network predictive models. Some proposed cascaded deep networks to efficiently evaluate a large number of candidate grasps. Others developed a highly-tailored CNN model to learn the dynamics of the granular material scooping task, and the cross entropy method (CEM) leveraging the learned prediction model is used for scoop planning. Yet others formulated grasping planning and solved it as a gradient-based optimization over the grasp configuration leveraging the grasp predication network. In one or more embodiments, excavation planning is modeled as an optimization problem which maximizes the probability of excavation success predicted by an excavation prediction network and solves the optimization using CEM.

3. Voxel-Based Planning

Some presented a voxel-based object representation and two 3D CNNs for multi-fingered grasp learning and planning. Others modeled environments with voxel-grids and presented a way for faster movement planning in such environments by predicting good path initializations. To overcome the simulation-to-real gap issue, embodiments of a 3D voxel-grid representation of the excavation scene are presented herein.

C. Embodiments for Excavation Task Defining and Excavation Trajectory Representation In this section, the excavation task for rigid objects and excavation trajectory representation is defined.

1. Task Overview

Embodiments of the present patent document focus on rigid objects excavation in clutter. Given the visual representation (i.e., the RGBD image or voxel-grid) Z of the current excavation scene, the goal is to plan a trajectory T that excavates rigid objects (e.g., stones or wood blocks) with the maximum total volume V. In one or more embodiments, an excavation instance/sample is defined to be a pair of the scene visual representation (RGBD image or voxel-grid representation of an excavation scene) and the excavation trajectory (Z, T). In one or more embodiments, the focus is on maximizing the excavated objects volume of the current excavation greedily without considering the future excavations. The excavation task may potentially be further extended as maximizing the accumulated excavated objects volume with a fixed number of excavations or emptying the target region of objects using the least number of excavations.

In embodiments of the present patent document, a standard 4 degrees of freedom (DoF) excavator model is emulated using a Franka Panda 7 DoF robot arm mounted with a 3D printed excavation bucket. FIG. 1 depicts mechanical structure of an excavator (left side) and a Franka arm "excavator" (right side) with a 3D printed bucket, according to embodiments of the present disclosure. The Franka arm "excavator" is shown with a scene setup, where rigid wood blocks are put in an excavation tray and the task is to excavate these blocks and dump them to a dumping tray after each excavation. The joints shown in FIG. 1 are the base swinging (102 and 112), boom (104 and 114), stick (106 and 116), and bucket (108 and 118) joint for the excavator and Franka respectively.

2. Embodiments of Excavation Trajectory Representation in Task Space

As shown in FIG. 1, an excavator arm usually has 4 DoF, including the base swinging, boom, stick, and bucket joint. The 4D excavation pose of the bucket in task (Cartesian) space comprises 3D excavation position (x, y, z) and the 1D excavation angle $\alpha$. The excavation angle determines the bucket orientation, which also equals to the sum of the joint angles of the last three excavation joints. The excavation angle is defined to be zero degree when the bucket orientation is horizontal and points away from the robot. The excavation angle is −90 degree when the bucket orientation is vertical and points down. One example of the excavation angle visualization may be seen from the closing excavation angle $\beta$ in FIG. 2.

Figure 2:
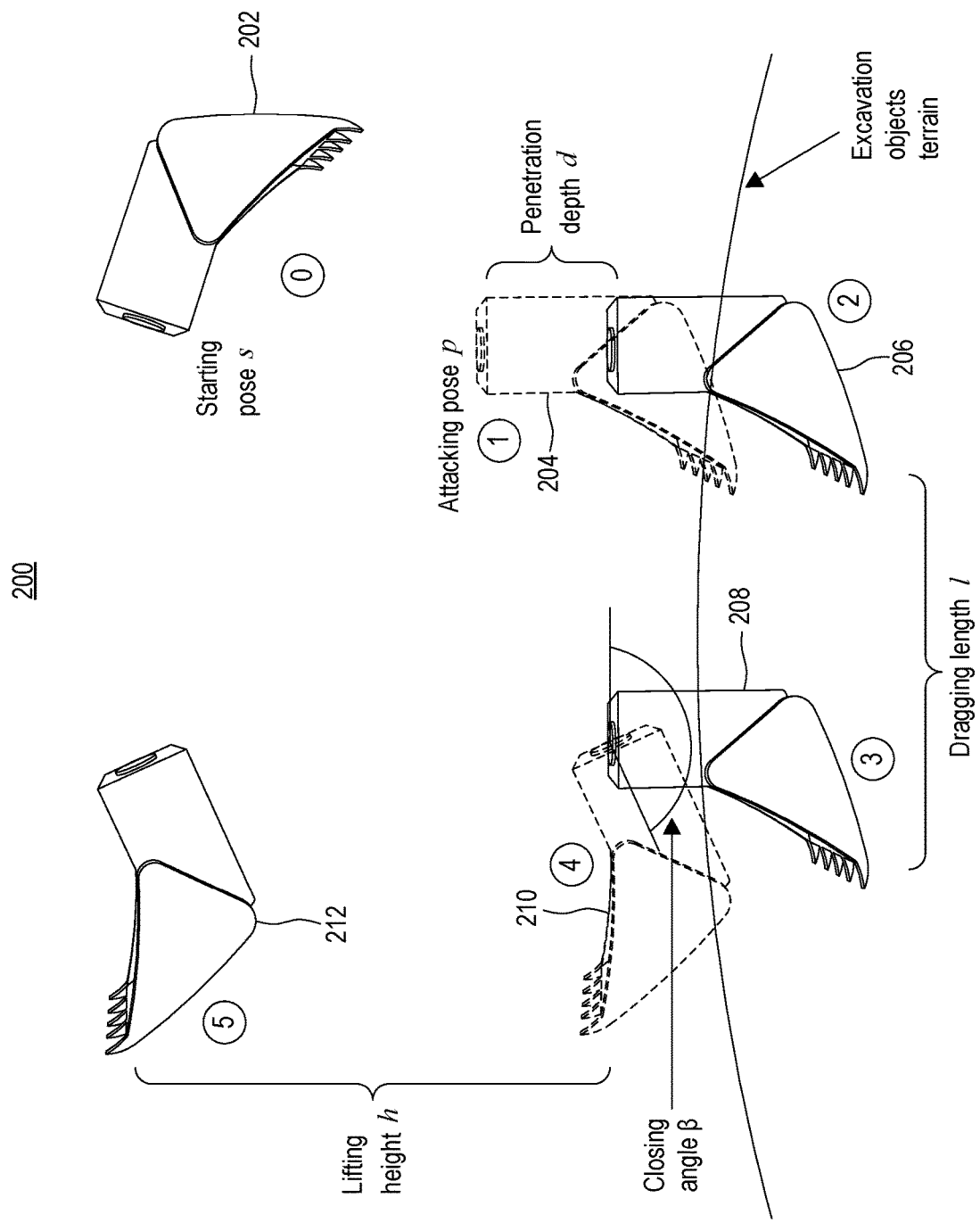
FIG. 2 depicts visualized excavation trajectory representation in a task space, according to embodiments of the present disclosure.

In general, an excavation trajectory T may be divided into multiple phases. FIG. 2 depicts visualized excavation trajectory representation in a task space, according to embodiments of the present disclosure. The trajectory is divided into 5 phases: attacking 204, penetration 206, dragging 208, closing 210, and lifting 212. In the attacking phase 204, the excavator arm moves the bucket from the starting pose 202 to its 4D target attacking pose p=(x, y, z, $\alpha$). In the penetration phase 206, the bucket penetrates into objects with a specified depth d along the gravity direction. Then in the dragging phase 208, the bucket drags horizontally towards the excavator base in the excavation plane for a given length l. Dragging allows the excavator arm to push and accumulate more objects into the bucket along the way. In the closing phase 210, the excavator arm decreases the angle between the bucket and the horizontal plane to manipulate objects into the bucket and close the bucket. The excavator arm closes the bucket by decreasing the wrist joint angle to $\beta$ degree. Finally, in the lifting phase 212, the excavator arm lifts the bucket to a certain height h.

In one or more embodiments, it is assumed that the attacking point is always on the surface of the objects clutter. Given the 2D or surface coordinate (x, y) of the attacking pose p, its z coordinate value on the objects clutter surface is computed as the height of the grid/height map of the objects clutter at (x, y). More details and examples of the grid map may be found in subsection F.3. In one or more embodiments, the lifting height h to lift the bucket is fixed to the height of the robot base. Therefore, a task space excavation trajectory T may be represented using 6 parameters T=(x, y, $\alpha$, d, l, $\beta$). The point of attack (x, y) may be learned and planned in an objects tray frame.

In one or more embodiments, with the 6D task trajectory parameters, the excavation trajectory is interpolated and its corresponding joint space trajectory is generated by applying inverse kinematics (IK) of the excavator arm. The interpolated joint trajectory waypoints are then sent to a position controller in both simulation and real world. Although the robotic arm is used for excavation in the present patent document, the task trajectory representation and excavator IK may also be translated directly to hydraulically actuated excavator arms.

D. Embodiments of Objects Excavation Learning and Planning

In this section, deep network model embodiments are presented to predict the excavation success for rigid objects in clutter. Embodiments of an excavation planner leveraging the learned prediction excavation model are then disclosed.

1. Embodiments of Excavation Scene Representation

Figure 8:
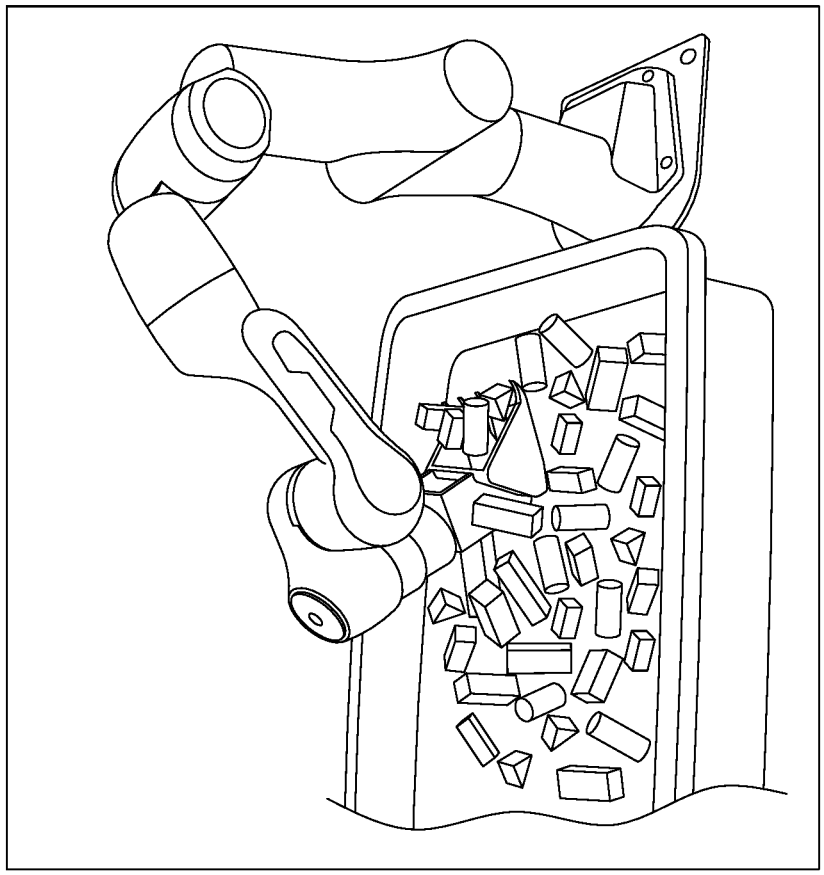
FIG. 8 depicts RGB image examples in simulation and real world, according to embodiments of the present disclosure.
Figure 8:
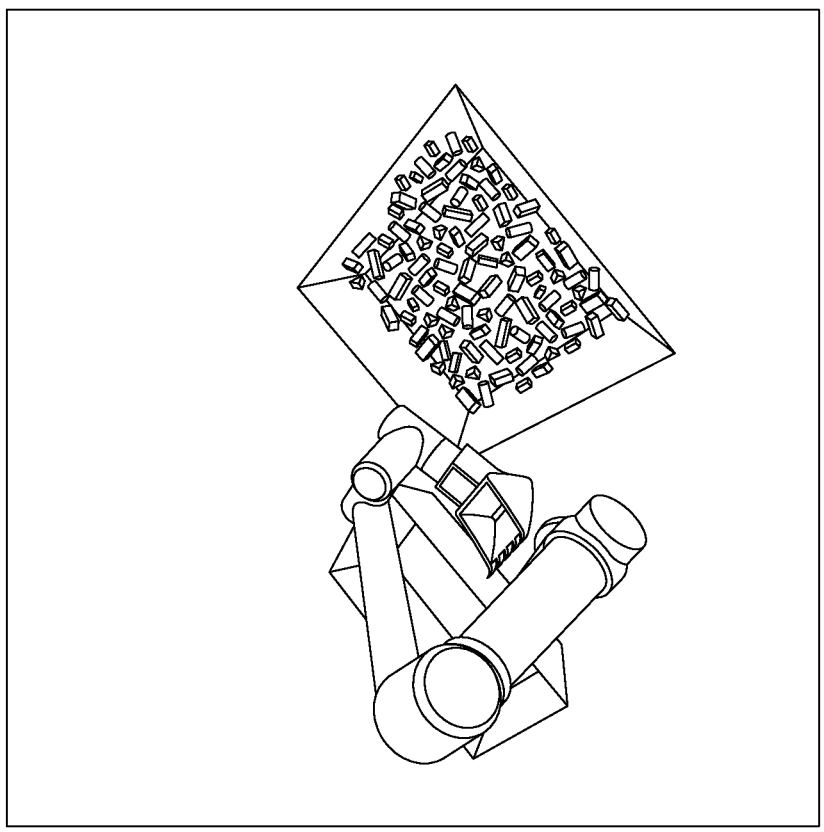

In one or more embodiments, two visual representations (the RGBD image and voxel-grid) for the excavation scene are considered. RGB and depth images are captured using an RGBD camera in simulation or real world. It turns out that the RGBD image representation suffers from a large simulation-to-real gap when transferring the learned excavation knowledge from simulation into real world, because (1) simulated excavation environment (e.g., the geometry and color of the excavation tray and the color of the floor) differs from the real-world excavation environment; (2) the RGBD image depends on the camera intrinsics and extrinsics. FIG. 8 shows the RGB image of the simulation and real world respectively.

Figure 3:
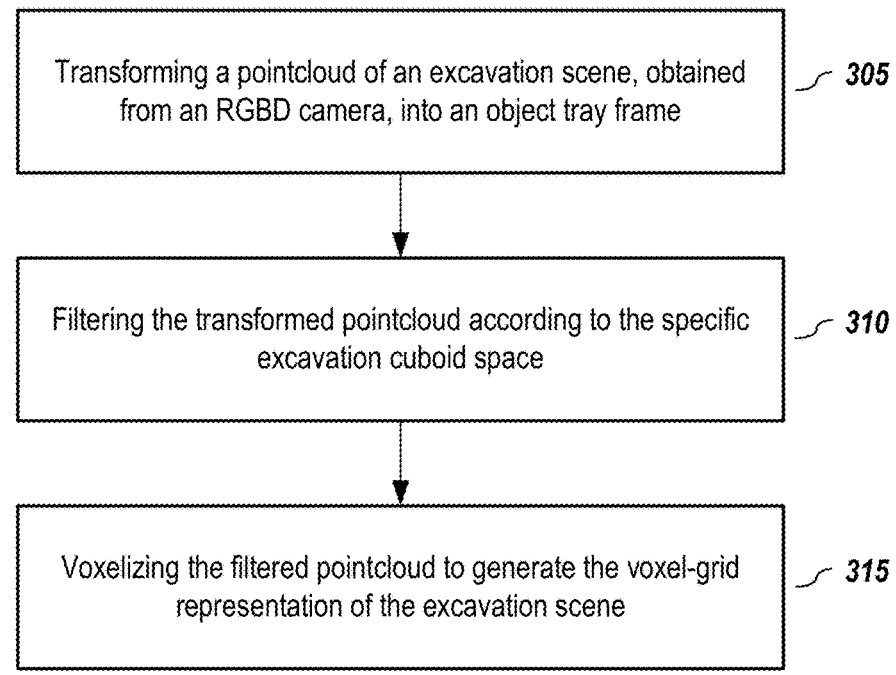
FIG. 3 depicts a process for generating a 3D voxel-grid representation of an excavation scene, according to embodiments of the present disclosure.
Figure 4:
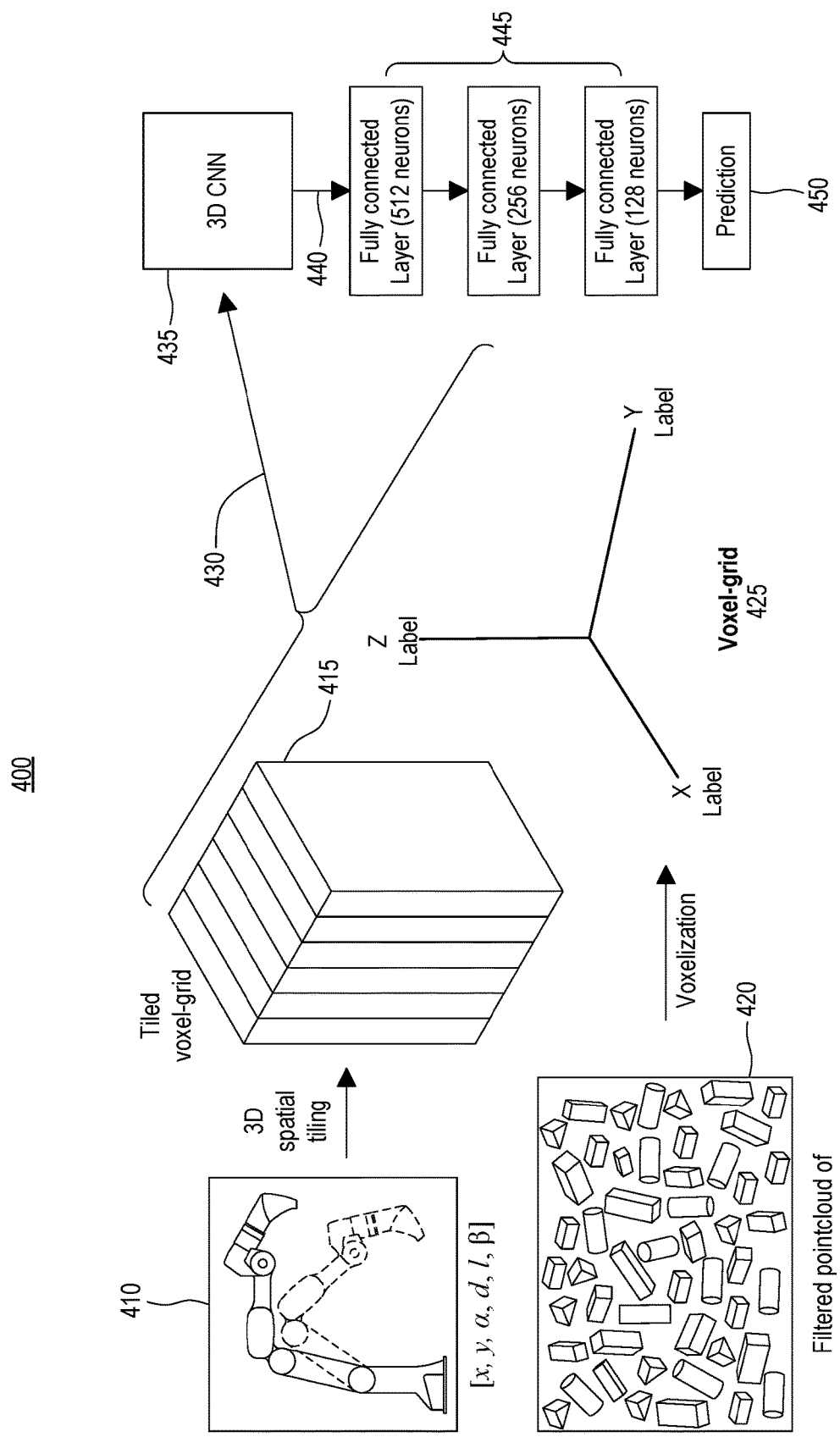
FIG. 4 depicts excavation-voxel-net architecture, according to embodiments of the present disclosure.

To overcome the simulation-to-real issue, embodiments of a 3D voxel-grid representation of the excavation scene are proposed. FIG. 3 depicts a process for generating a 3D voxel-grid representation of an excavation scene, according to embodiments of the present disclosure. In step 305, a pointcloud (i.e., depth) of an excavation scene obtained from an RGBD camera is first transformed into an object tray frame. In step 310, the transformed pointcloud is filtered according to the specific excavation cuboid space. In step 315, the filtered pointcloud is voxelized to generate the voxel-grid representation of the excavation scene. More details of the excavation space specification for simulation and real world may be found in subsections F.1 and F.2. For example, the voxel-grid has a dimension of 64×64×32 with a resolution of 0:01 m. FIG. 4 shows an example of the voxel-grid visualization and its source pointcloud. The voxel-grid dimension and resolution may be empirically designed to cover the excavation space and maintain a reasonable level of visual details.

Since the voxelization only focuses on the specified excavation space, the voxel-grid representation is not affected by the environment surroundings. Moreover, the voxel-grid representation is agnostic to the camera intrinsics and extrinsics because the voxelization is applied in the tray frame instead of the camera frame. Various experimental results in Section E demonstrate the simulation-to-real benefits of the voxel-grid representation over the RGBD one.

2. Embodiments of Excavation Prediction Model

In one or more embodiments, the excavation prediction is modeled as a binary classification problem. The excavation classifier predicts the probability of excavation success (i.e., bucket filling success), Y, as a function of an excavation instance. In the present patent document, two CNN models are proposed to predict the excavation success probability, namely "excavation-RGBD-net" and "excavation-voxel-net". Each model takes an excavation instance comprising a task trajectory and a RGBD image (or voxel-grid) as input and predicts the excavation success probability as output.

Residual Network (ResNet) provides one of state-of-the-art CNN architectures for various computer vision tasks such as image classification and object detection. In one or more embodiments, ResNet-18 (a CNN that is 18 layers deep) is utilized as the backbone architecture of excavation-RGBD-net and extended to 3D CNN as the backbone of excavation-voxel-net. Offline validation results in subsection F.5 and the experiments in Section E empirically show the effectiveness of both models, especially excavation-voxel-net. One skilled in the art shall understand that, inspired from the present patent document, some other alternative network structures, such as scoop & dump-net for the 2D CNN RGBD model and voxel-config-net or the shape completion CNN for the 3D voxel model, etc., may also be potentially applicable for excavation planning. Such alternative network structures shall be within the scope of the present patent disclosure.

Figure 5:
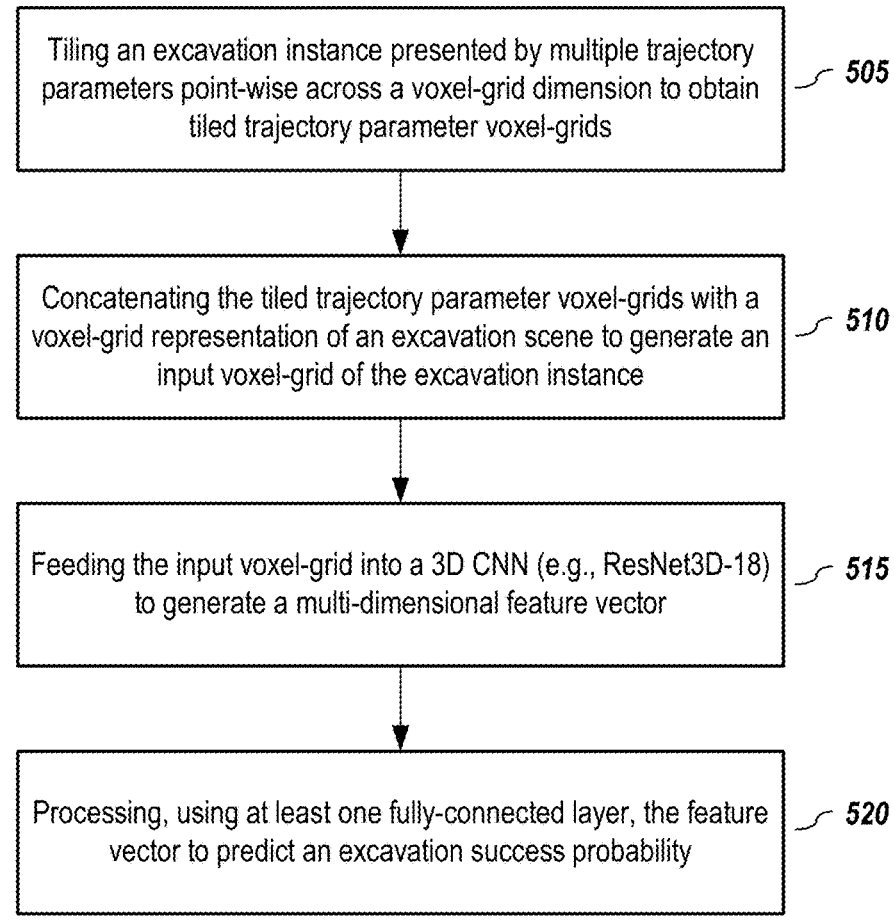
FIG. 5 depicts a process for learning-based excavation prediction, according to embodiments of the present disclosure.

FIG. 4 depicts excavation-voxel-net architecture using ResNet-18, and FIG. 5 depicts a process for learning-based excavation prediction using the excavation-voxel-net architecture shown in FIG. 4, according to embodiments of the present disclosure. In step 505, an excavation instance 410 presented by multiple trajectory parameters is tiled pointwise across a voxel-grid dimension (e.g., 64×64×32) to obtain tiled trajectory parameter voxel-grids 415. In step 510, the tiled trajectory parameter voxel-grids are then concatenated with a voxel-grid representation 425 of an excavation scene to generate an input voxel-grid 430 of the excavation instance. In one or more embodiments, the input voxel-grid has multiple channels corresponding to the dimension of each voxel in total. For example, the input voxel-grid may have seven channels with one channel for the scene voxel-grid and six channels for the tiled trajectory parameters. The scene voxel-grid may be obtained by voxelization of filtered pointcloud of an excavation scene 420.

In one or more embodiments, 2D convolution filters of a raw ResNet-18 are replaced with 3D convolution filters to build a ResNet3D-18 backbone. In step 515, the input voxel-grid 430 is fed into a 3D CNN (e.g., ResNet3D-18) 435 to generate a multi-dimensional (e.g., 1000-dimension) feature vector 440. The feature vector (e.g., ResNet3D-18 feature vector) is then processed, in step 520, using at least one fully-connected layer (e.g., 3 layers) 445 to predict an excavation success probability. In one or more embodiments, the three fully-connected layers have 512, 256, and 128 rectified linear unit (ReLu) neurons, respectively. The fully-connected layers may be tuned empirically during training. In one or more embodiments, the at least one fully-connected layer is followed by a sigmoid output layer 450 to process the feature vector 440. In one or more embodiments, batch normalization is applied for all fully-connected layers except the output layer. In one or more embodiments, the excavation classifier is trained using a cross entropy loss.

In one or more embodiments, the excavation-RGBD-net may share a similar architecture with the excavation-voxel-net, except that the raw ResNet-18 backbone with 2D convolution is used for excavation-RGBD-net and the trajectory parameters are tiled in the image space instead of voxel-grid space.

In one or more embodiments, to compare with classification, the excavation prediction may also be modeled as a regression problem. Excavation-RGBD-net and excavation-voxel-net may be adapted to "excavation-RGBD-reg-net" and "excavation-voxel-reg-net" respectively by replacing the sigmoid output layer with a fully-connected layer. The regression models may be trained using the smooth L1 loss (i.e., Huber loss).

In one or more embodiments, in order to show the importance of the scene dependency for excavation learning and provide a data-driven baseline for experiments, a fully-connected excavation classification network "excavation-traj-net" is also developed. The scene-independent excavation-traj-net may only take the task trajectory without the visual scene representation as input. It has three fully-connected layers with 512, 256, and 128 ReLu neurons respectively. Its final sigmoid layer outputs the excavation success probability.

In summary, five excavation prediction model embodiments are presented in the present patent document: excavation-RGBD-net, excavation-voxel-net, excavation-traj-net, excavation-RGBD-reg-net, and excavation-voxel-reg-net.

3. Embodiments of Learning-Based Excavation Planning

Given the excavation scene visual representation Z, the goal is to plan an excavation trajectory T that maximizes the probability of excavation success, Y. In one or more embodiments, the excavation planning is formulated as an optimization problem:

$$\underset{T}{\arg\max}\, p(Y = 1 \mid T, Z, W) = f(T, Z, W) \tag{1}$$

In Equation 1, f (T, Z, W) defines a neural network classifier with logistic output trained to predict the excavation success probability as a Bernoulli distribution over Y. The parameters W define the neural network parameters.

Figure 6:
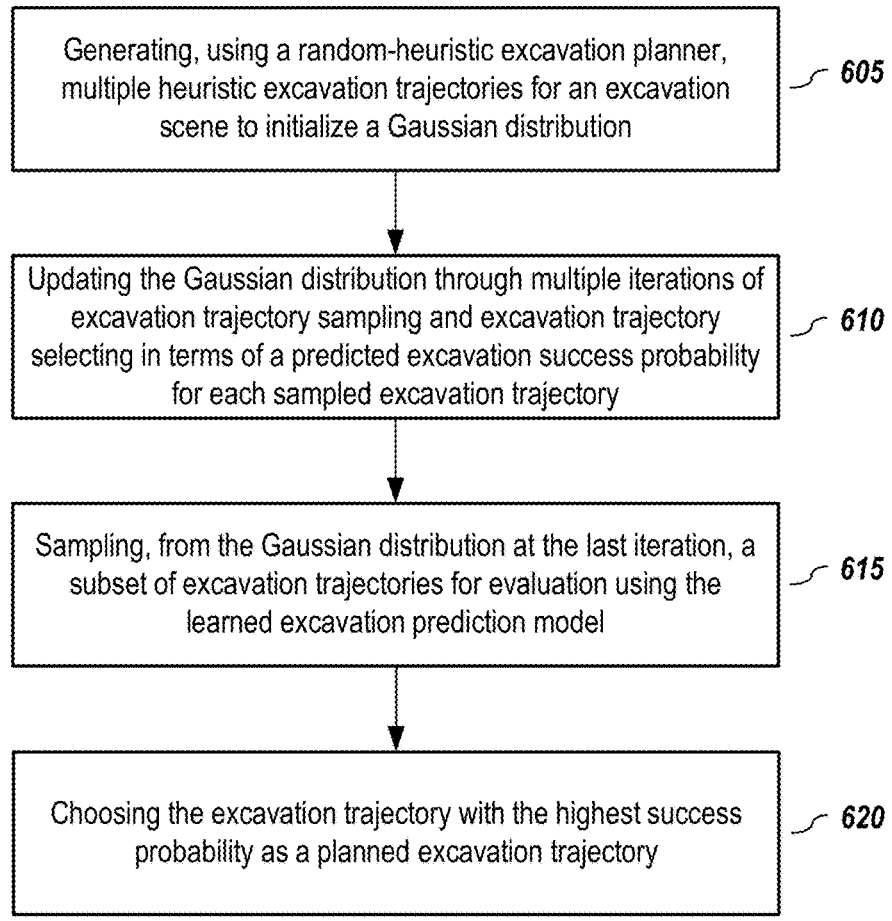
FIG. 6 depicts a process for learning-based excavation planning, according to embodiments of the present disclosure.

In one or more embodiments, CEM may be used for leveraging the learned excavation prediction model to solve the excavation optimization problem. FIG. 6 depicts a process for learning-based excavation planning, according to embodiments of the present disclosure. As a sampling-based optimization approach, CEM iteratively samples from the current distribution and selects the top K samples using a scoring function to update the distribution. A Gaussian distribution of the 6D task trajectory parameters is to be optimized, given the visual representation of the current excavation scene. In step 605, multiple (e.g., 256) heuristic excavation trajectories for an excavation scene are generated using a random-heuristic (random-heu) excavation planner to initialize a Gaussian distribution. More details of the random-heu planner may be seen from subsection F.3. In step 610, the Gaussian distribution is updated through multiple iterations of excavation trajectory sampling and excavation trajectory selecting in terms of predicted excavation success probability for each sampled excavation trajectory. In this step, multiple (e.g., 5) iterations are used for CEM excavation planning to update the Gaussian distribution. At each iteration, multiple (e.g., 256) excavation trajectory samples are first sampled from the current distribution. Then an excavation success probability of each excavation trajectory is predicted using the learned excavation prediction model. Afterwards, a top subset (e.g., 64) of samples in terms of predicted excavation success probabilities are selected to update the Gaussian distribution. To summarize, CEM uses the learned prediction model as a quality metric to iteratively improve the distribution of the task trajectory parameters through sampling and distribution updating. In step 615, a subset (e.g., 64) of excavation trajectories are sampled from the Gaussian distribution at the last iteration for evaluation using the learned excavation prediction model. In step 620, the excavation trajectory with the highest predicted success probability is chosen as a planned task excavation trajectory. In one or more embodiments, the chosen excavation trajectory may need to be a valid 1K solution and have a valid attacking point range.

E. Experimental Results

In this section, the excavation experiment setup and results in simulation are first described. Afterwards, the experiment setup and results in real world are presented. Embodiments of the presented learning-based planners are compared with two heuristic planners and a data-driven baseline planner in simulation and real world. Experimental results demonstrate that the learning-based planners are able to plan high-quality excavations and significantly outperform the baseline methods. The data collection, model training, offline validation, more detailed results analysis, and ablation study are provided in the following Section F of Experimental Appendix.

It shall be noted that these experiments and results are provided by way of illustration and were performed under specific conditions using a specific embodiment or embodiments; accordingly, neither these experiments nor their results shall be used to limit the scope of the disclosure of the current patent document.

1. Experiment Setup in Simulation

Training data are collected and simulated experiments are performed in PyBullet. A UR5 robot arm is used for excavation data collection. The UR5 arm has 6 DoF in total. The shoulder panning, shoulder lifting, elbow, and the first wrist joints of the UR5 arm are controlled, while the other two wrist joints are disabled by fixing their joint angles in simulation. A 3D designed bucket is used as the end-effector of UR5 in simulation. The full volume of the bucket is 450 $cm^3$.

Figure 7:
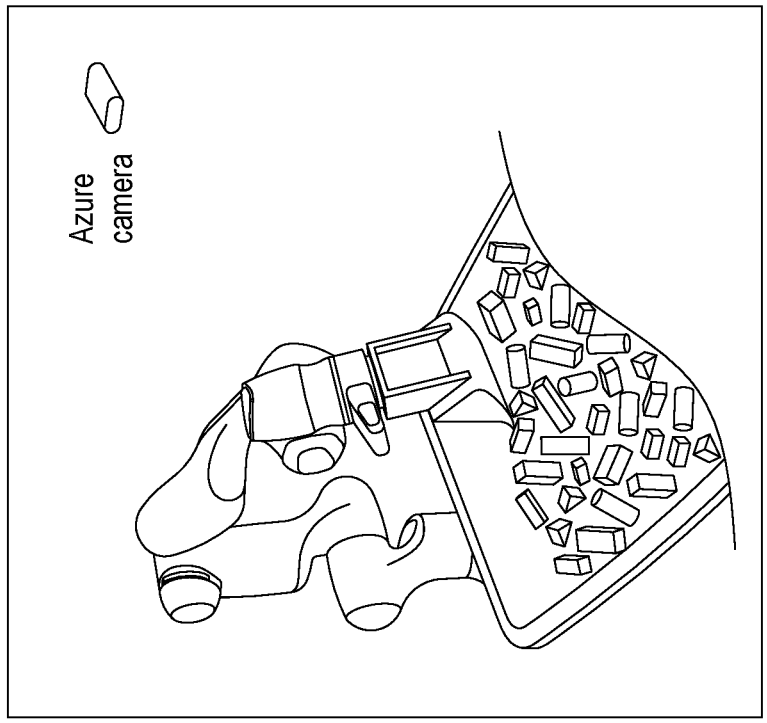
FIG. 7 depicts RGB-Depth (RGBD) camera setup in simulation and real world, according to embodiments of the present disclosure.
Figure 7:
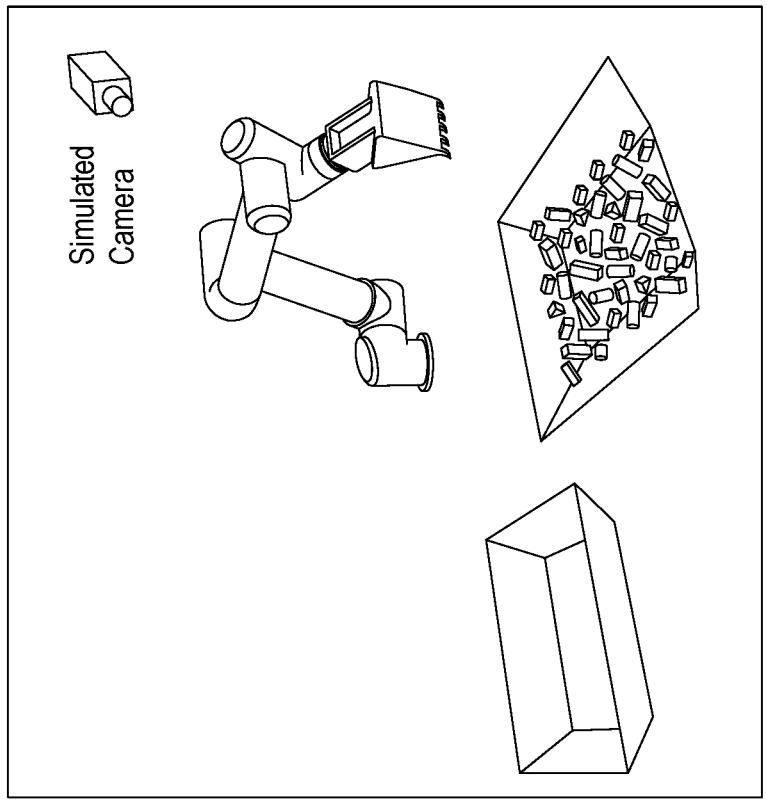

In one or more embodiments, the RGB and depth image of each excavation trial may be generated by a built-in simulated camera in PyBullet. FIG. 7 shows a camera setup in simulation (on the left). One example of the RGB image generated by the simulated camera may be seen from FIG. 8 on the left. More details of the camera and excavation scene setup for real-robot experiments are discussed in subsection F.1.

In one or more embodiments, for each experiment trial of a certain excavation planner, the joint space trajectory may be interpolated and computed from its planned task trajectory T using IK. Then the joint trajectory is sent the joint space waypoints to a joint position controller of the UR5 arm in simulation.

2. Experiments in Simulation

Simulated experiments were performed to evaluate learning-based planners of excavation-voxel-net, excavation-RGBD-net, excavation-voxel-reg-net, excavation-RGBD-reg-net, and excavation-traj-net. These learning-based planners are named "CEM-voxel", "CEM-RGBD", "CEM-voxel-reg", "CEM-RGBD-reg", and "CEM-traj" respectively. CEM-traj serves as a data-driven baseline planner without visual scene representation input. In addition, these five learning-based planners are compared with two heuristic planners: random-heu and highest-heu. More details of these two heuristic planners can be found in subsection F.3. Multiple excavation episodes, e.g., 100 episodes, are experimented for each method. Ten excavation trials are sequentially performed for each excavation episode. That provides 1000 excavation experimented trials in total for each method.

The simulated experiment results of all seven different methods are presented in Table I. Excavations of each planner are benchmarked using three metrics: the volume of excavated objects (excavation volume), the excavated objects number, and the excavation success rate. Same as the model training in subsection F.4, if the total volume of a sample's successfully excavated objects is above a predetermined threshold (i.e., 134 $cm^3$ or 30% bucket filling rate), it is counted as a success, otherwise a failure. Computation time of each planner is also reported.

The mean with standard deviation in parentheses are listed for all metrics except the success rate. The mean and standard deviation for each method are computed across its 1000 experimented excavation trials. As shown in Table 1, CEM-voxel achieves the best excavation performance in terms of the excavation volume, excavated object number, and success rate. CEM-voxel excavates objects of 136 $cm^3$ per excavation in average, which is 30.2% of the full bucket volume (i.e. bucket volume filling rate). CEM-voxel, CEM-RGBD, and CEM-voxel-reg outperform the two heuristic planners and CEM-traj by relatively large margins in terms of these 3 excavation metrics, which shows the effectiveness of the scene-dependent excavation learning.

TABLE 1

Experimental results of seven excavation planners in simulation

| Method | Volume ($cm^3$) | Number | Success Rate | Time (s) |
| --- | --- | --- | --- | --- |
| CEM-voxel | 136.23 (106.14) | 7.58 (6.05) | 51.9% | 10.5 (0.77) |
| CEM-RGBD | 129.78 (101.50) | 7.51 (6.03) | 48.1% | 17.3 (0.28) |
| CEM-voxel-reg | 127.89 (105.22) | 7.15 (6.09) | 47% | 10.44 (0.29) |
| CEM-RGBD-reg | 107.93 (98.18) | 6.29 (5.73) | 35.3% | 17.4 (0.27) |
| CEM-traj | 97.27 (100.73) | 5.54 (5.87) | 32.4% | 3.17 (0.28) |

TABLE 1-continued

Experimental results of seven excavation planners in simulation

| Method | Volume (cm³) | Number | Success Rate | Time (s) |
| --- | --- | --- | --- | --- |
| random-heu | 85.81 (87.65) | 4.73 (4.99) | 28.4% | 0.2 (0.03) |
| highest-heu | 67.24 (76.43) | 3.36 (4.19) | 19.3% | 0.2 (0.02) |

Classification-based CEM-voxel and CEM-RGBD perform better than regression-based CEM-voxel-reg and CEMRGBD-reg respectively. Since classification is about predicting a label and regression is about predicting a continuous quantity, it is believed that excavation regression is more complex and needs a lot more training data to perform as well as or better than excavation classification.

The fact that scene-dependent planner CEM-voxel, CEMRGBD, and CEM-voxel-reg significantly outperform the scene-independent CEM-traj planner demonstrates that it is important to learn to plan excavation trajectories based on the visual scene information.

The five learning-based planners all have higher standard deviations in terms of excavation volume and objects number than the two heuristic planners. CEM-voxel has the highest standard deviation. The experiment results of heuristic planners are dominated by failure excavations with low excavation volumes. Learning-based planners, especially CEMvoxel, generate excavations with relatively higher excavation volumes. This makes the excavation volume distribution of learning-based planners more uniform and have larger standard deviations, which is shown by the volume histogram of different planners in FIGS. 12A-12H.

Figure 9:
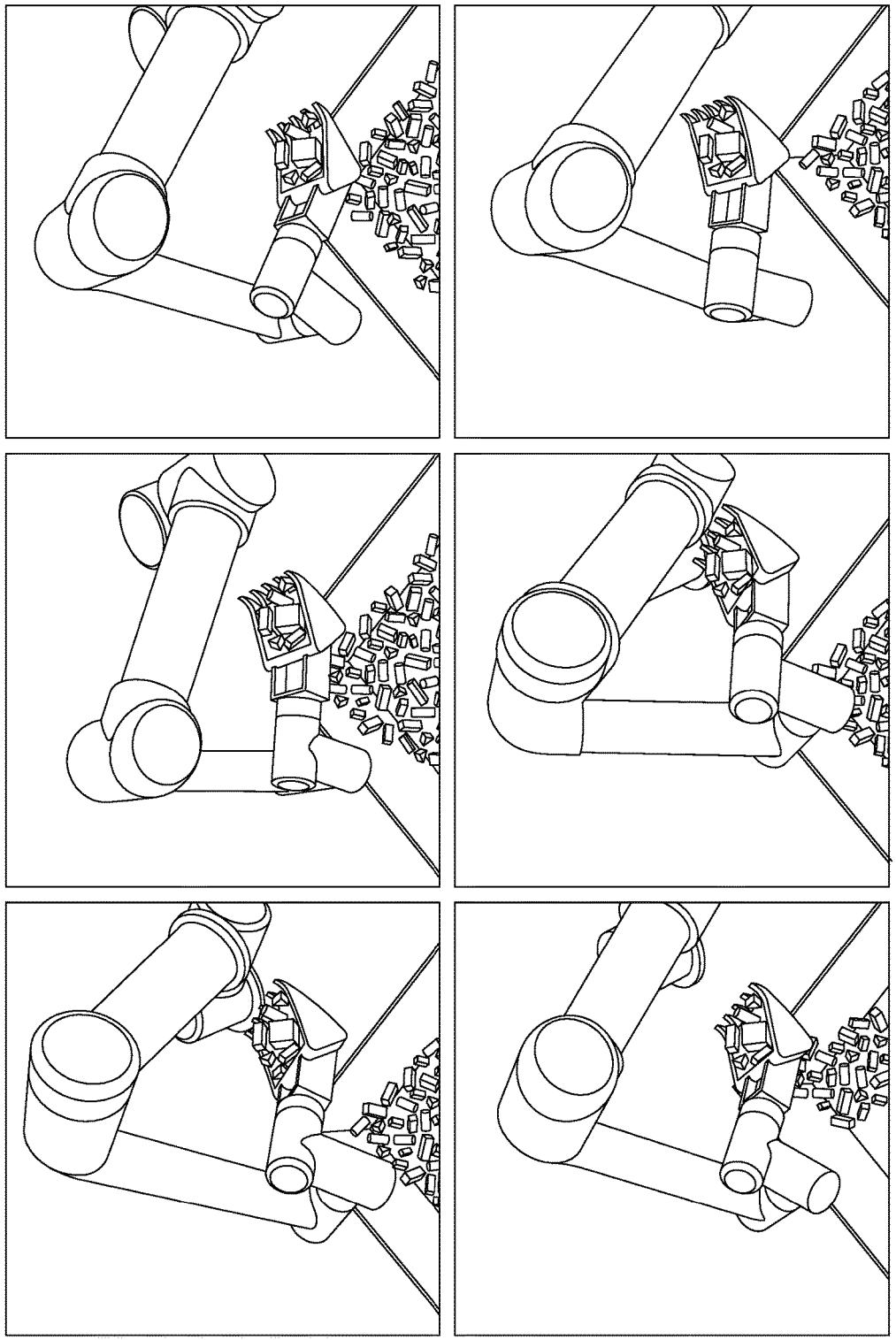
FIG. 9 depicts simulated excavations generated by a CEM-voxel planner, according to embodiments of the present disclosure.

In terms of computation speed, heuristic planners spend 0.2 second to plan one excavation trajectory. It takes CEM-voxel, CEMRGBD, CEM-voxel-reg, and CEM-RGBD-reg more than 10 seconds to generate one excavation trajectory. It costs CEM-traj 3 seconds to plan a trajectory. Finally, FIG. 9 visualizes 6 high-quality excavation examples planned by the CEM-voxel planner in simulation.

3. Experiments Setup in Real World

Real-robot excavation experiments are performed using a Franka Panda robotic arm. The Franka Panda arm has 7 DoF in total. The shoulder panning, shoulder lifting, elbow lifting, and the wrist lifting joint of the Franka arm are controlled as the excavation joints, while the other three joints (i.e. the elbow panning and the last two wrist joints) are disabled by fixing their joint angles. The same bucket model used in simulation is 3D printed as the Franka arm end-effector. The Azure Kinect camera generates the RGBD image and pointcloud of the excavation scene. Camera setup in real world is shown in the right side of FIG. 7. An example of the Azure RGB image showing the excavation setup is shown on FIG. 8. More details of the camera and excavation scene setup for real-robot experiments are introduced in subsection F.2.

For each experiment trial of a certain planner, the joint space trajectory is computed from the planned task trajectory T using IK, and the joint space trajectory is sent to the built-in joint position controller of the Franka arm. The Franka arm can only produce a limited amount of force and torque. For example, Franka's force and torque range along z (i.e., gravity direction) are [−50; 150] N and [−10; 10] Nm respectively. Considering the large resistive force of rigid objects, this makes it hard for the bucket to penetrate into the rigid objects. During penetration, the robot is automatically commanded to alternatively shift the bucket back or forth by 2 cm horizontally per waypoint, which helps prevent the robot getting stuck.

4. Real Robot Experiments

The excavation model learned on UR5 in simulation is transferred to Franka in real world for rigid objects excavation experiments. The representation of the excavation trajectory in task space allows the excavation prediction model transferring from one hardware platform to another with similar kinematic reachability. The reachability of UR5 and Franka arm are 850 mm and 800 mm respectively. In addition to the task trajectory representation, excavation poses in the tray frame are represented to make excavation learning and planning agnostic to different tray poses across simulation and real world.

Excavation experiments are performed to evaluate embodiments of the presented learning-based planners CEM-voxel and CEM-RGBD, which achieve the best performance in simulation experiments. Embodiments of the learning-based planners are also compared to two heuristic planners (random-heu and highest-heu). Five excavation episodes were experimented for each method in real world. Rigid objects for each excavation episode were randomly reset. Five excavation trials were performed for each excavation episode. Accordingly, there are 25 excavation experimented trials in total for each method.

Details of these two heuristic planners for simulation are described in subsection F.3. Random parameter ranges of heuristic planners in real world are smaller than those in simulation. Because experiments with large heuristic ranges can be unsafe for human or robot. For example, relatively long dragging lengths cause collision with the tray. Moreover, the Franka arm can only produce a limited amount of force and torque, which makes it difficult to penetrate into the rigid objects with a depth larger than 5 cm. Specifically, the attacking excavation angle $\alpha$ and the closing angle $\beta$ were randomly generated in the range of [−110, −70] and [−110, −140] degree respectively in real world. The penetration depth d and the dragging length l were randomly generated in the range of [0.02, 0.05] m and [0.02, 0.06] m respectively. The trajectory parameter range of heuristic planners also affect the presented learning-based planners, since heuristic excavation trajectories were generated to initialize CEM, as described in subsection F.3.

The real-robot experiment results of all four methods are presented in Table 2. Excavation performance is evaluated in terms of the volume of excavated objects and the excavation success rate. The mean with standard deviation in parentheses is reported for the volume of excavated objects. The success threshold of the volume of excavated objects is 134 cm³, same as simulation.

TABLE 2

Real-robot experimental results of
four excavation planning methods

| Method | Volume (cm$^3$) | Success Rate | Valid Rate |
| --- | --- | --- | --- |
| CEM-voxel | 110.32 (120.42) | 11/25 | 17/25 |
| CEM-RGBD | 13.84 (67.8) | 1/25 | 2/25 |
| random-heu | 50.24 (79.95) | 5/25 | 12/25 |
| highest-heu | 13.36 (26.51) | 0/25 | 19/25 |

Figure 11:
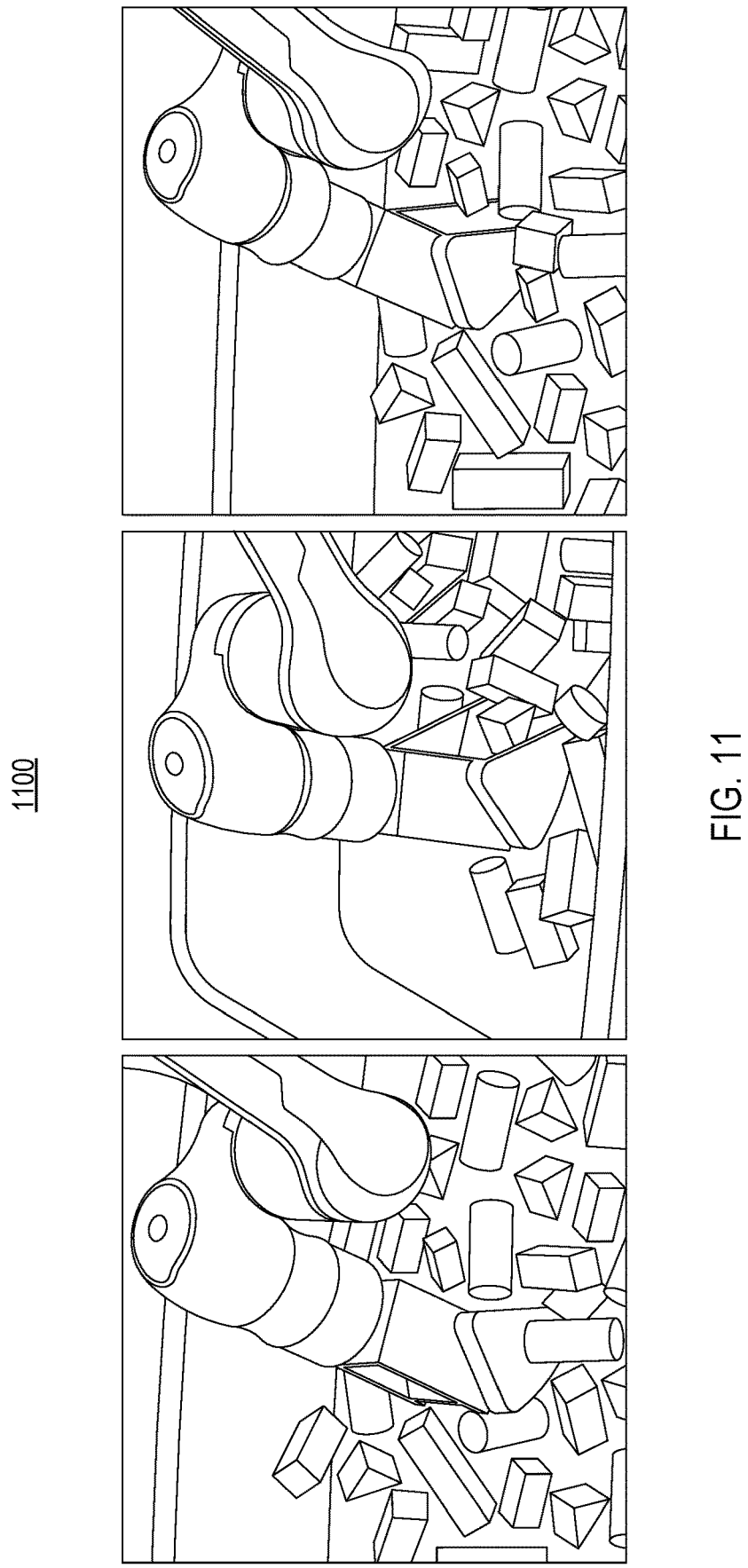
FIG. 11 depicts three examples of the robot getting stuck due to force/torque exceeding limit during excavation, according to embodiments of the present disclosure.

Table 2 also shows the valid rate of each planner. An excavation trial is treated as valid if the trajectory can be planned and executed successfully. Invalid excavation trials are mostly caused by limit exceeding of the robot force/torque. Large resistive force during excavation, especially penetration, and collision with the tray can both lead to the force/torque limit exceeding. Examples of the Franka arm getting stuck due to force/torque limit exceeding are shown in FIG. 11. Force control for excavation trajectory execution may also be examined in order to mitigate force/torque limit exceeding. Excavation trials without valid trajectory IK are also counted as invalid.

As shown in Table 2, the CEM-voxel planner significantly outperforms these other 3 planners in terms of the volume of excavated objects and success rate in real world. CEM-voxel excavates objects of 110 cm$^3$ per excavation in average, which is 24.4% of the full bucket volume. CEM-voxel significantly outperforms these two heuristic planners, which demonstrates the effectiveness of excavation learning in real world. The fact that CEM-voxel outperforms CEM-RGBD shows that the voxel-based visual representation handles the sim2real gap better than the RGBD representation. The computation time of each planner in the real world is similar with simulation.

The CEM-RGBD planner performs poorly in the real world, worse than random-heu and roughly on par with highest-heu. The attacking poses of the trajectories planned by CEM-RGBD are mostly close to the edge of the tray, which leads to invalid excavation trials with collision. This is because the RGBD image representation suffers from a large sim2real gap when transferring the excavation knowledge gained in simulation into real world. In addition to the poor excavation performance, another evidence of the RGBD sim2real gap is that the predicted success probabilities of the CEM-RGBD trajectories are close to zero in real world. More details of the excavation scene visual representation are discussed in subsection E.1.

Figure 10:
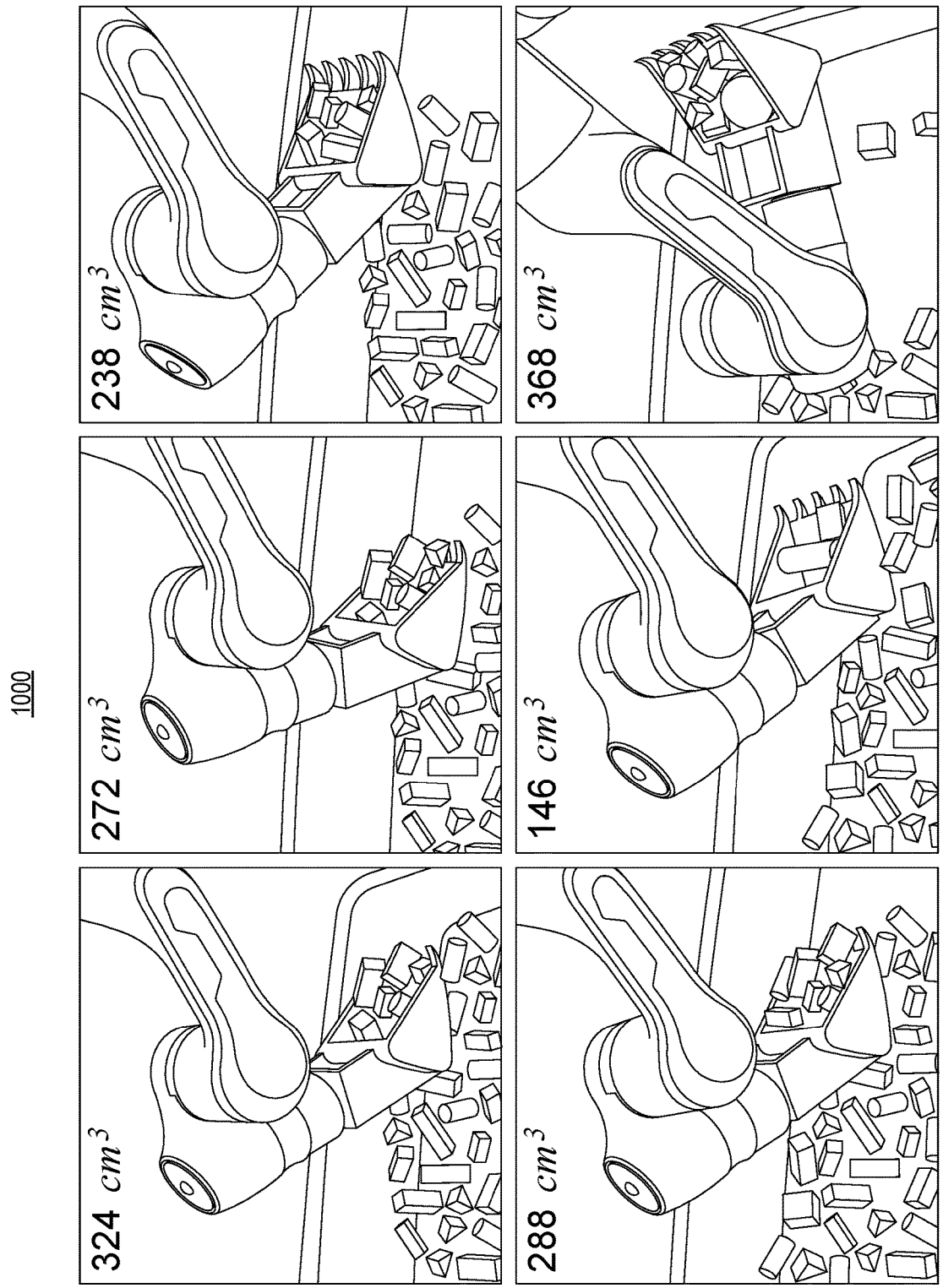
FIG. 10 depicts successful real robot excavations generated by the CEM-voxel planner together with their bucket filling volumes, according to embodiments of the present disclosure.

FIG. 10 shows six high-quality excavation examples planned by the CEM-voxel planner on the real robot, with volume of excavated objects annotated on each example.

F. Experimental Appendix

The experimental appendix section first introduces the excavation scene setup in simulation and real world, describes the data collection and training of the excavation prediction model, and presents offline evaluation of the learned model results. Furthermore, excavation volume histograms, trajectory analysis, and ablation experiments are also discussed.

As defined in subsection C.2, a task space excavation trajectory T may contains six parameters T=(x, y, α, d, l, β). In one or more embodiment, (x, y) and (α, d, l, β) of a task trajectory T are named as "Point of Attack" (PoA) and "Geometric Trajectory Parameters" (GTP) respectively for the ablation study.

1. Camera and Excavation Scene Setup in Simulation

The camera is located at (0.5 m, 0.8 m, 0.91 m) in the robot base frame as shown on left side of FIG. 7. The y axis of the robot frame points from the robot base to the tray center. The z axis of the robot frame is along the gravity direction. Both the transformation between the camera and the robot base frame and the transformation between the robot base frame and the tray frame are known. With these two transformations, the pointcloud obtained from the PyBullet RGBD camera can be transformed into the tray frame for grid map and voxel-grid generation.

There are n objects sampled uniformly in the range of [200, 400] for each excavation scene. The same number of testing objects is then spawned with random poses into the tray for the current excavation scene. The testing object meshes are unseen from training as described in subsection F.3. The 0.38×0.4×0.3 m$^3$ cuboid range is specified to filter the pointcloud of the excavation scene in the tray frame, which is then used for grid map and voxel-grid generation. This cuboid range covers the excavation space of rigid objects in the tray in simulation.

2. Camera and Excavation Scene Setup in Real World

The Azure camera is located at (0:57 m, 1 m, 1:14 m) in the robot frame as shown on right side of FIG. 7. The y axis of the robot frame points from the robot base to the tray center. Its z axis is along the gravity direction. The transformation between the camera and the robot base frame is manually calibrated using an ArUco marker. The tray frame is manually defined with respect to the robot base frame according to the excavation range, which gives the transformation between the robot and the tray frame. The tray frame has the same orientation with the robot base frame. Its origin is defined to be the center of the excavation cuboid range. Knowing these two transformations, the pointcloud obtained from the Azure camera can be transformed into the tray frame for grid map and voxel-grid generation.

Multiple rigid wooden objects with various geometrical shapes and colors are used for real robot experiments, including 100 "Melissa & Doug wood blocks" and 32 "Biubee wooden stone balancing blocks". For example, there are objects with both convex and concave shapes. The density of the wooden rigid objects is estimated to be 0.5 kg/cm$^3$. All of these rigid objects are unseen from the training.

A layer of rocks with heavy mass is first put into the excavation tray, which stabilizes the tray during excavation. Then a layer of mulch is laid on top of rocks. Finally rigid wooden objects are put on top of the mulch in front of the Franka arm for excavation. The relatively deformable mulch is used as the excavation surface for safety reasons. The 0.4×0.3×0.3 m$^3$ cuboid range is specified to filter the pointcloud of the excavation scene in the tray frame, which is used for grid map and voxel-grid generation. This cuboid space covers the excavation space of the real-robot experiments. Roughly only the half of the tray space that is closer to the robot base is used for excavation experiments.

An excavation episode is created by shaking these 132 rigid objects in a box, and then pouring them into the excavation area of the tray. The robot dumps the excavated objects into a dumping tray after excavation for each trial. A certain amount of mulch under the rigid objects can be excavated and dumped sometimes. In average the amount of excavated mulch is relatively small across all experimented trials.

The desired dumping pose of the bucket end-effector is specified to be the center of the dumping tray. The robot first moves to the desired dumping pose, then pours the objects into the dumping tray by controlling the bucket to point down vertically. A kitchen scale is used under the dumping tray to weigh the objects dumped into the tray for each trial. Having the mass of the excavated objects and the objects density, the volume of excavated objects may be computed.

3. Data Collection in Simulation

A UR5 arm with a 3D designed bucket is used to perform excavation experiments in simulation. The full bucket volume of the bucket is 450 cm³. The data collection setup is the same with the simulated experiment setup in subsection E.1. The camera and excavation scene setup for data collection is described in subsection F.1. Rigid object meshes with random geometry for simulated excavation are generated using trimesh. The number of vertices for each object mesh are randomly selected in the range of 10 to 50. The maximum value of each coordinate is uniformly sampled from 1 cm to 5 cm for the object mesh. The 3D coordinates of all vertices of the object mesh are randomly generated from the range of 0 to its maximum coordinate values. The convex hull of the original mesh is computed and used as the final object mesh. Object density is assumed to be 6 g/cm³ in simulation. Together, 100 k training and testing candidate object meshes are separately generated. The training object mesh dataset is used for training data collection in simulation. The testing object mesh dataset is used for excavation prediction model offline evaluation and experiments in simulation.

A certain number of object meshes are randomly selected from the training objects set for each excavation episode of the data collection. Each selected object is then spawned into the excavation tray with a randomly generated pose. The objects number of each scene is randomly and uniformly generated in the range of 50 to 400. Twenty excavation trials are sequentially executed for each excavation episode. One of two heuristic planners is randomly selected to compute the total volume of the objects excavated successfully at each trial. The excavated objects are dumped into the dumping tray with random poses for each excavation trial. For offline validation of the excavation prediction network, 50,000 training excavation samples and 10,000 testing samples are collected.

Heuristic Excavation Planners: two heuristic excavation planners are designed for data collection, namely "heu-random" and "heu-highest". For the heu-random planner, a grid map cell of the excavation scene is randomly selected and used its center as the 2D coordinate (x, y) of the attacking excavation pose. For the heu-highest planner, the 2D coordinate (x, y) of the attacking excavation pose is generated as the center of the grid map cell with the maximum height. The attacking point is assumed on the object clutter surface. Under this assumption, the z coordinate value of the attacking excavation pose is computed as the height of the corresponding grid map cell.

The excavation grid map is generated from the pointcloud of the excavation space using a grid map library in both simulation and real world. The attacking excavation angle $\alpha$ and the closing angle $\beta$ are randomly generated in the range of $[-120, -60]$ and $[-180, -120]$ degree respectively. The penetration depth d and the dragging length l are randomly generated in the range of $[0.05, 0.2]$ m and $[0.05, 0.4]$ m respectively. The same random parameter ranges are used for data collection and experiments in simulation.

4. Excavation Prediction Model Training

For excavation prediction model training, 50,000 training excavation samples in simulation are collected. Among training excavation samples, 45,000 training samples are used for training and the other 5,000 training samples are used as a validation set. For excavation binary classification, if the total volume of a sample's successfully excavated objects is above 134 cm³, the excavation sample is treated as a success, otherwise a failure. Excavation samples without valid task trajectory IK are labeled as failure excavations, which aims to learn to plan excavation trajectories with valid IK. Out of these 50,000 (10%) training samples, 4768 are successful excavations.

All five excavation prediction models, including excavation-RGBD-net, excavation-voxel-net, excavation-RGBD-reg-net, excavation-voxel-reg-net, and excavation-traj-net, are trained using the same specifications. In order to overcome the class imbalance (i.e., low percentage of successful excavation samples), the successful samples are over-sampled to make the number of positive and negative samples roughly the same in each training epoch for all five models. Results of training the excavation-RGBD-net from scratch and from fine-tuning ResNet-18 are compared. Training from scratch has significantly better performance, probably because the excavation task is significantly different from the ResNet ImageNet classification. In addition to excavation-RGBD-net, all other four models are also trained from scratch.

All networks are trained using the Adam optimizer with mini-batches of size 64 for 50 epochs. The learning rate starts at 0.1 and decreases by 10× every 10 epochs. The training of excavation-RGBD-net and excavation-RGBD-reg-net takes around 810 minutes on an Alienware desktop computer with an Intel i7-6800K processors, 32 GB RAM, and a Nvidia GeForce GTX TITAN Z graphics card. It takes excavation-voxel-net and excavation-voxel-reg-net around 500 minutes to train on the same machine. It takes excavation-traj-net 101 minutes to train on the same machine. All excavation prediction networks are implemented in PyTorch.

5. Excavation Prediction Model Offline Evaluation

For offline validation of the excavation prediction models, 10,000 testing samples are collected using the testing objects dataset in simulation. Among these 10,000 testing samples, 967 samples are successful excavations.

Table 3 shows the accuracy, precision, recall, and F1 score of three different methods. The second, third, and fourth row show the offline testing results of the excavation-voxel-net, excavation-RGBD-net, and excavation-traj-net respectively. The "random-0.5" method in the fifth row refers to random guessing with a probability of 0.5 for positive prediction. The "random-0.1" method in the last row means random guessing with a probability of 0.1 for positive prediction. The prediction metrics of random guessing show the classification challenges due to the low percentage of successful excavation samples. Excavation-voxel-net and excavation-RGBD-net perform reasonably well and significantly outperform random guessing in terms of these offline evaluation metrics. Excavation-voxel-net achieves the best offline evaluation performance. Excavation-traj-net performs worse than excavation-voxel-net and excavation-RGBD-net for the offline evaluation, but significantly better than random guessing.

TABLE 3

The offline evaluation results of the excavation-voxel-net, excavation-RGBD-net, excavation-traj-net, and random guessing for classifying the excavation success on the testing set

| Method | Accuracy | Precision | Recall | F1 |
|---|---|---|---|---|
| excavation-voxel-net | 0.904 | 0.502 | 0.637 | 0.562 |
| excavation-RGBD-net | 0.877 | 0.399 | 0.542 | 0.459 |
| excavation-traj-net | 0.731 | 0.241 | 0.827 | 0.373 |

TABLE 3-continued

The offline evaluation results of the excavation-voxel-net, excavation-RGBD-net, excavation-traj-net, and random guessing for classifying the excavation success on the testing set

| Method | Accuracy | Precision | Recall | F1 |
|---|---|---|---|---|
| random-0.5 | 0.5 | 0.1 | 0.5 | 0.17 |
| random-0.1 | 0.82 | 0.1 | 0.1 | 0.1 |

The excavation regression model excavation-voxel-reg-net and excavation-RGBD-net are also offline-evaluated on the testing set using the L1-norm error. The mean and standard deviation of the testing L1-norm error of excavation-voxel-reg-net are 31:94 $cm^3$ and 37:66 $cm^3$ respectively. The testing L1-norm error of excavation-RGBD-reg-net has a mean of 35:22 $cm^3$ and a standard deviation of 43:71 $cm^3$. Both regression models achieve reasonably good testing performance.

6. Excavation Volume Histograms of Experiments in Simulation

The histograms of the excavation volume for the 1000 simulated experimented excavations of seven planners are visualized in FIGS. 12A-12G. In addition to the excavation volume means and the excavation rates shown in Table 1, the histograms further show that the learning-based planners excavate objects with larger volumes than heuristic planners. The histograms also show that the distributions of learning-based planners are more uniform and have larger standard deviations than heuristic planners. Only the excavation histograms of simulation experiments are shown here, since the number of excavations in real world experiments is relatively small.

Figure 12A:
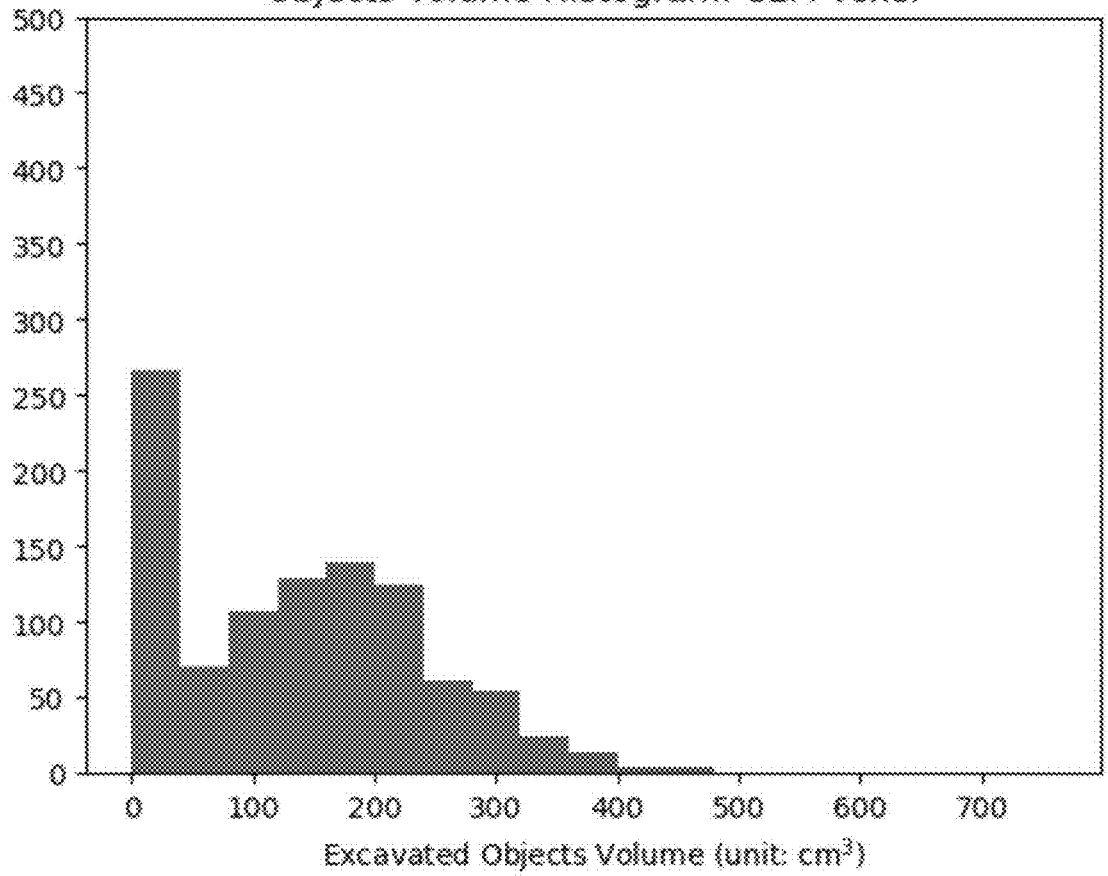
FIG. 12A depicts an excavation volume histogram of CEM-voxel in simulated experiments, according to embodiments of the present disclosure.
Figure 12B:
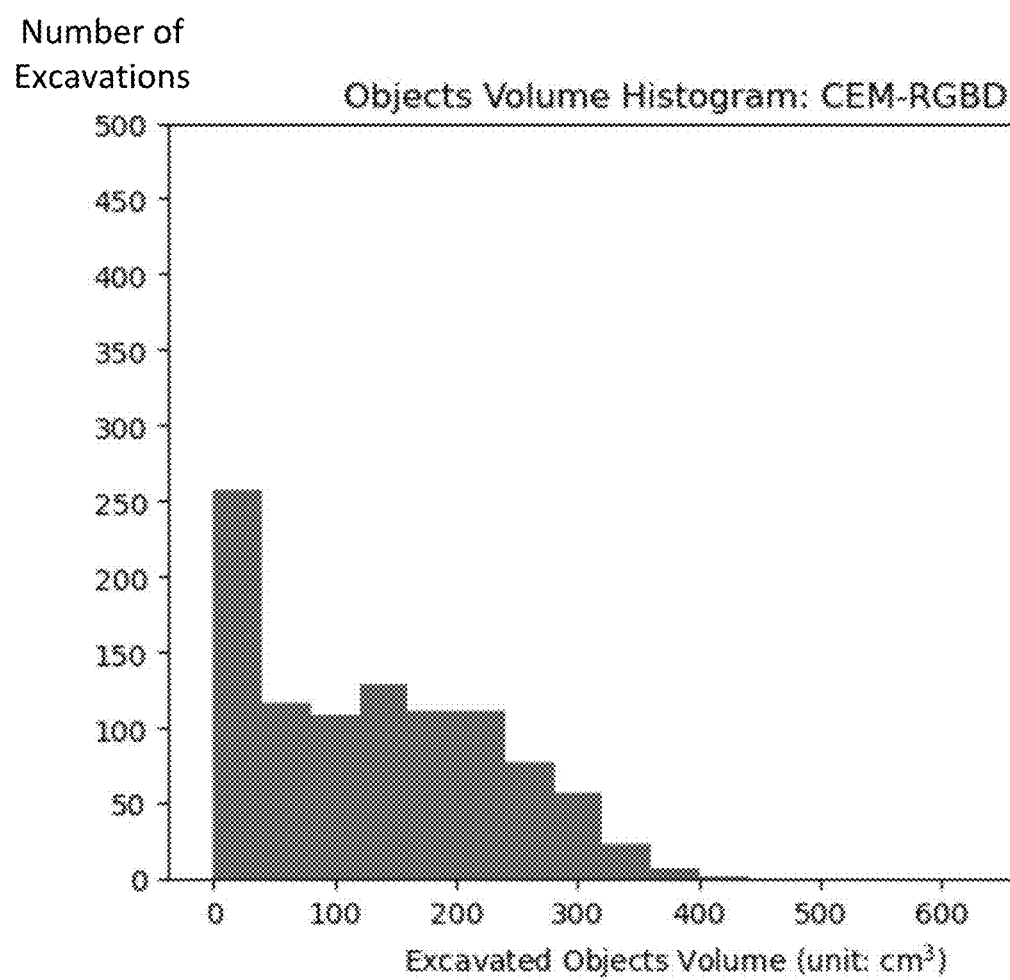
FIG. 12B depicts an excavation volume histogram of CEM-RGBD in simulated experiments, according to embodiments of the present disclosure.
Figure 12C:
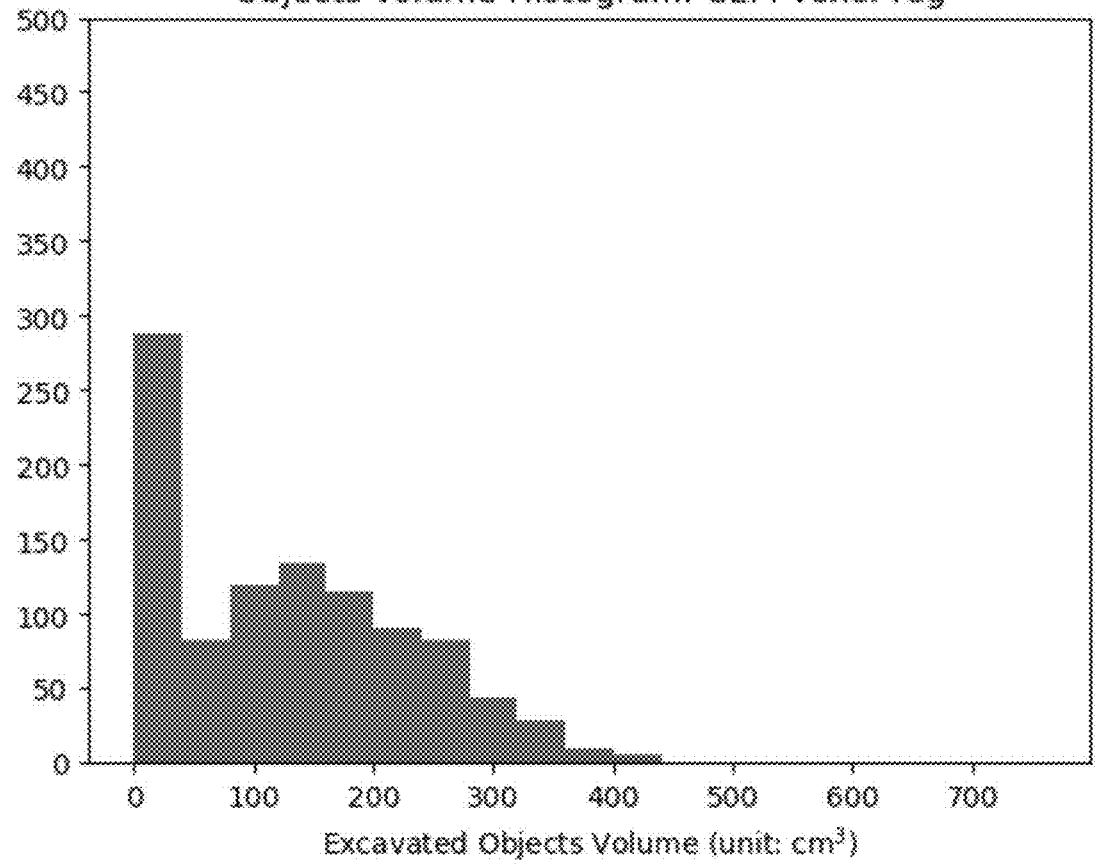
FIG. 12C depicts an excavation volume histogram of CEM-voxel-reg in simulated experiments, according to embodiments of the present disclosure.
Figure 12D:
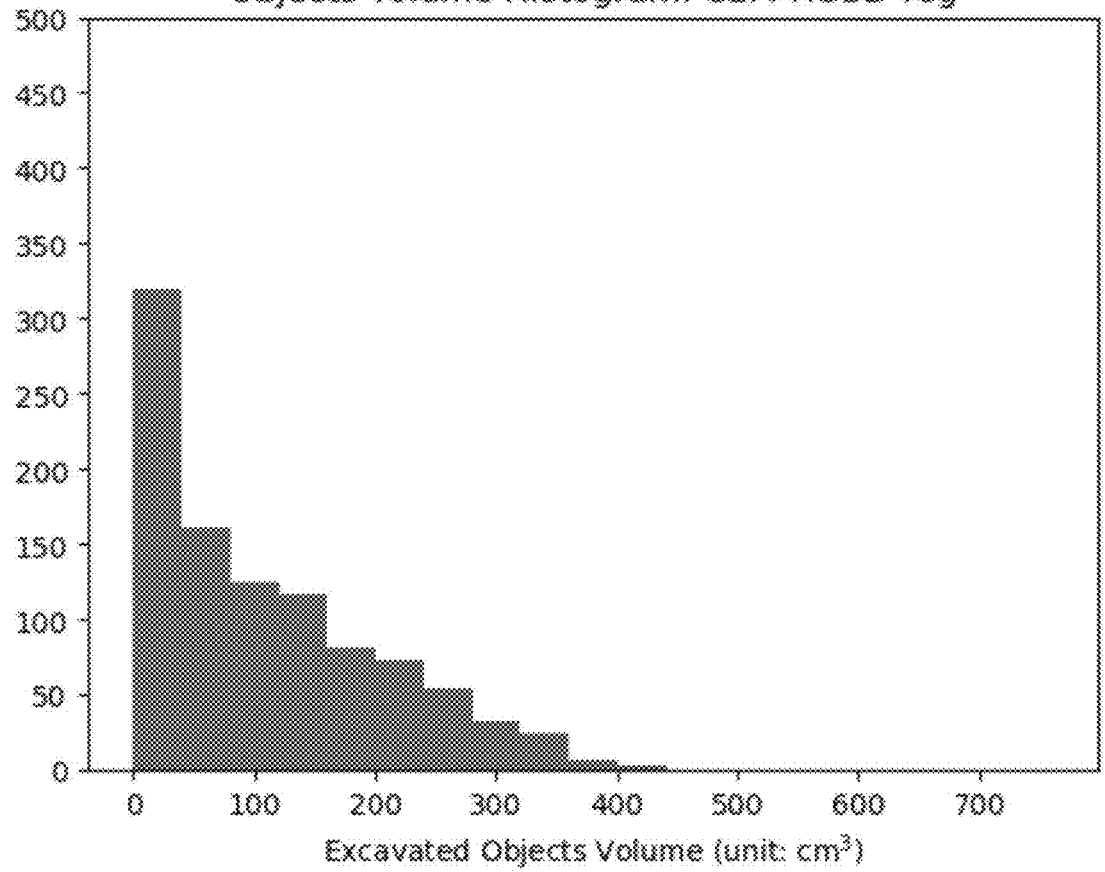
FIG. 12D depicts an excavation volume histogram of CEM-RGBD-reg in simulated experiments, according to embodiments of the present disclosure.
Figure 12E:
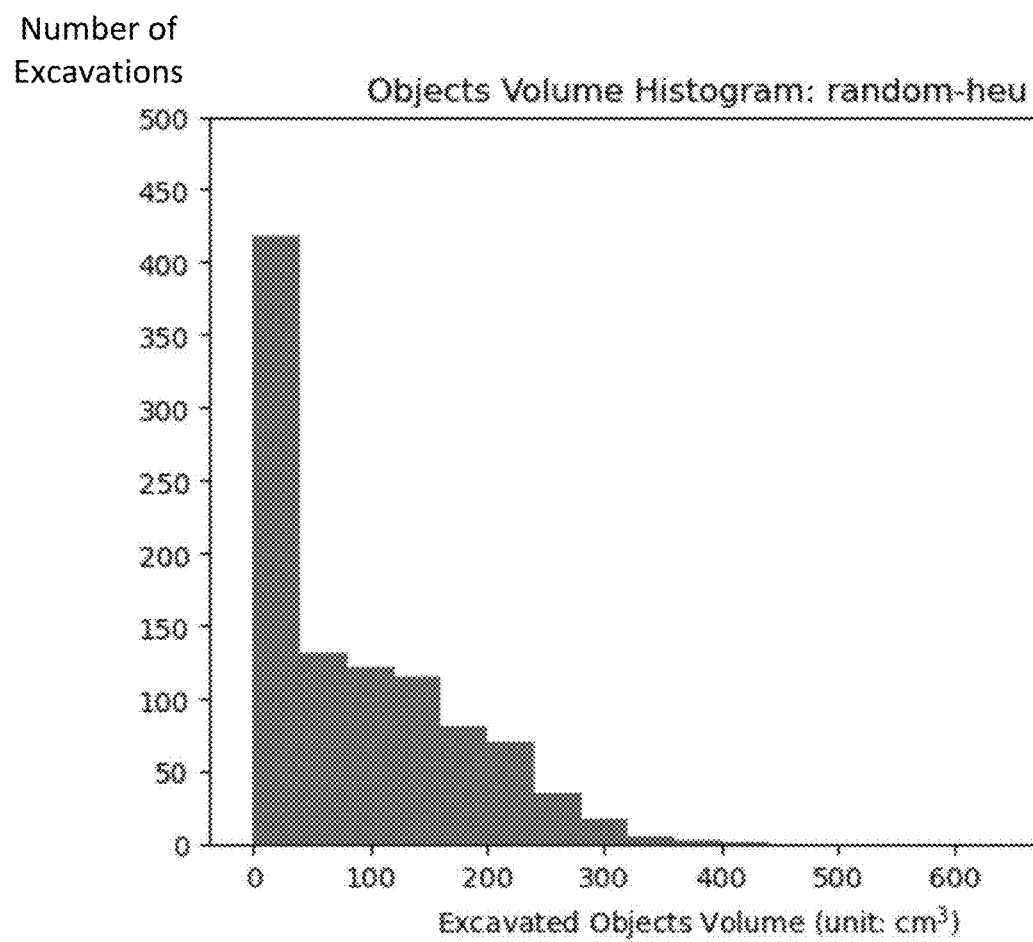
FIG. 12E depicts an excavation volume histogram of CEM-traj in simulated experiments, according to embodiments of the present disclosure.
Figure 12F:
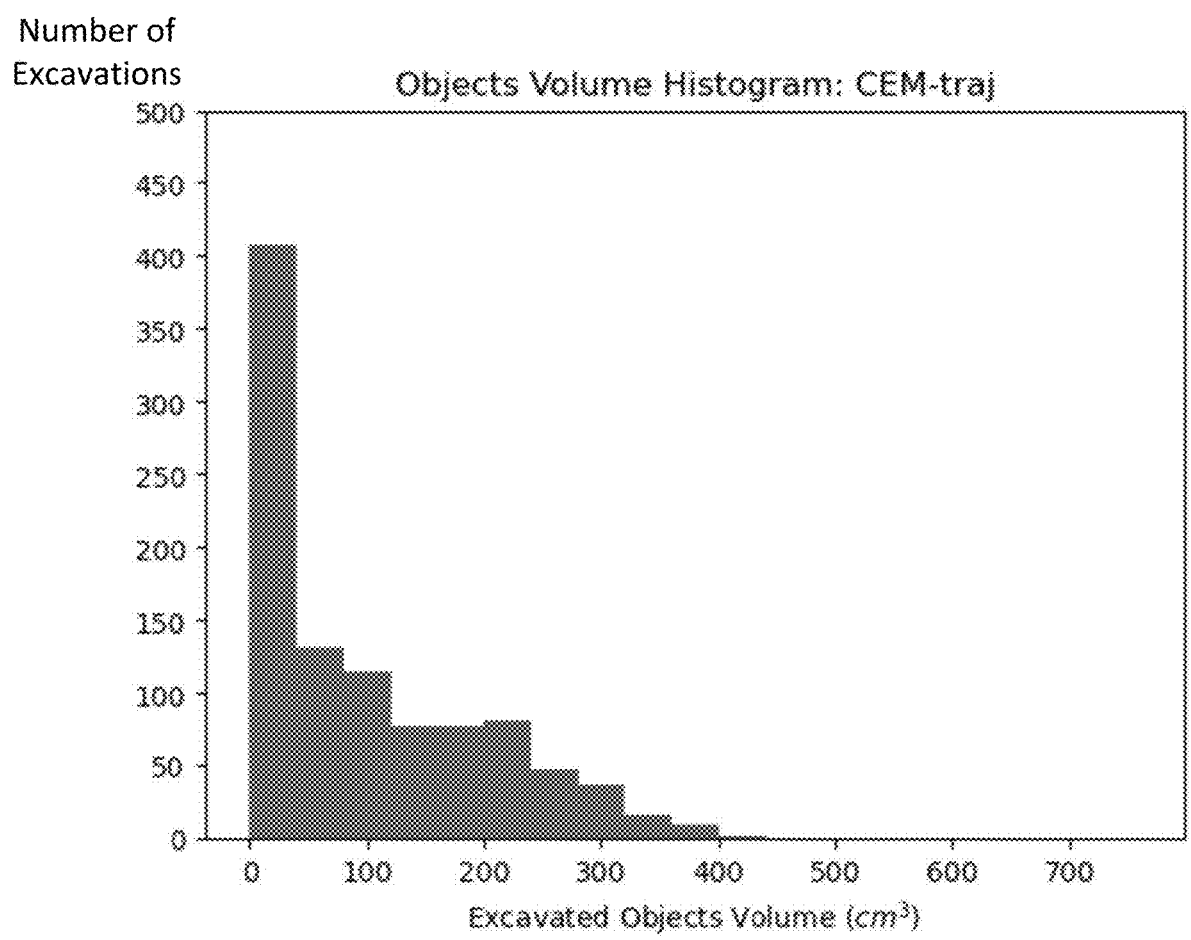
FIG. 12F depicts an excavation volume histogram of random-heu in simulated experiments, according to embodiments of the present disclosure.
Figure 12G:
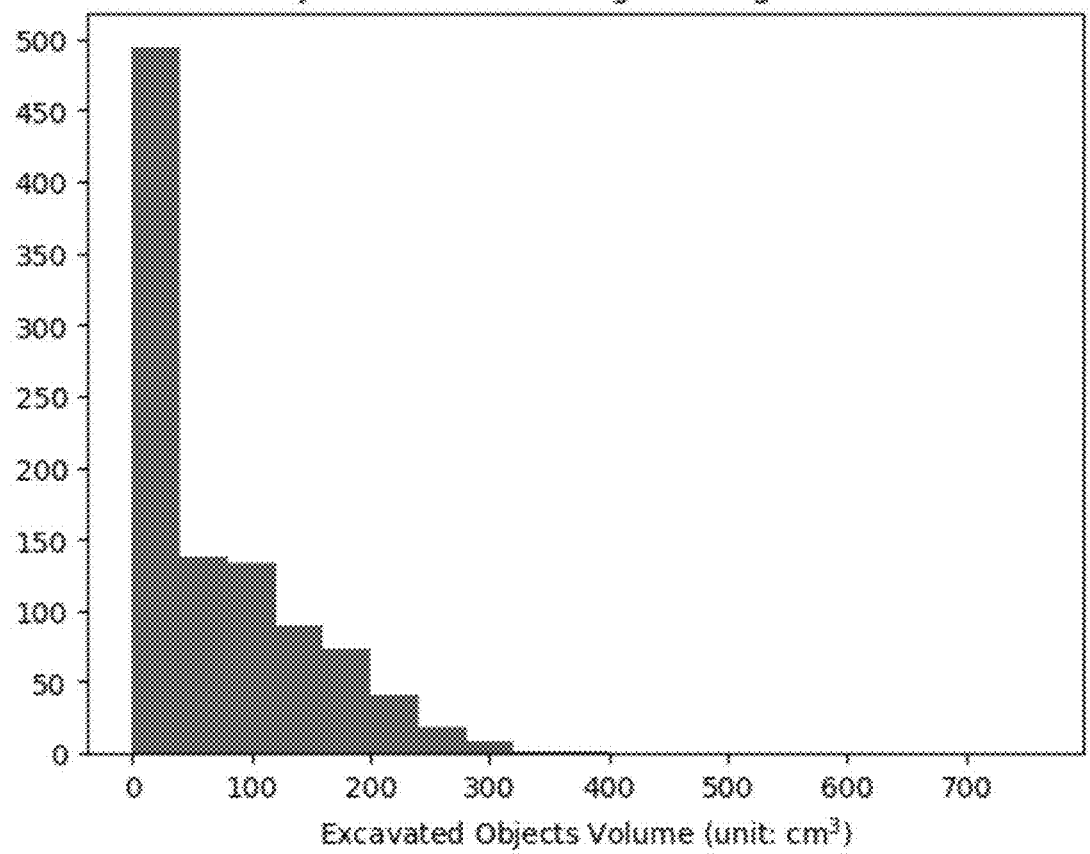
FIG. 12G depicts an excavation volume histogram of highest-heu in simulated experiments, according to embodiments of the present disclosure.
Figure 12H:
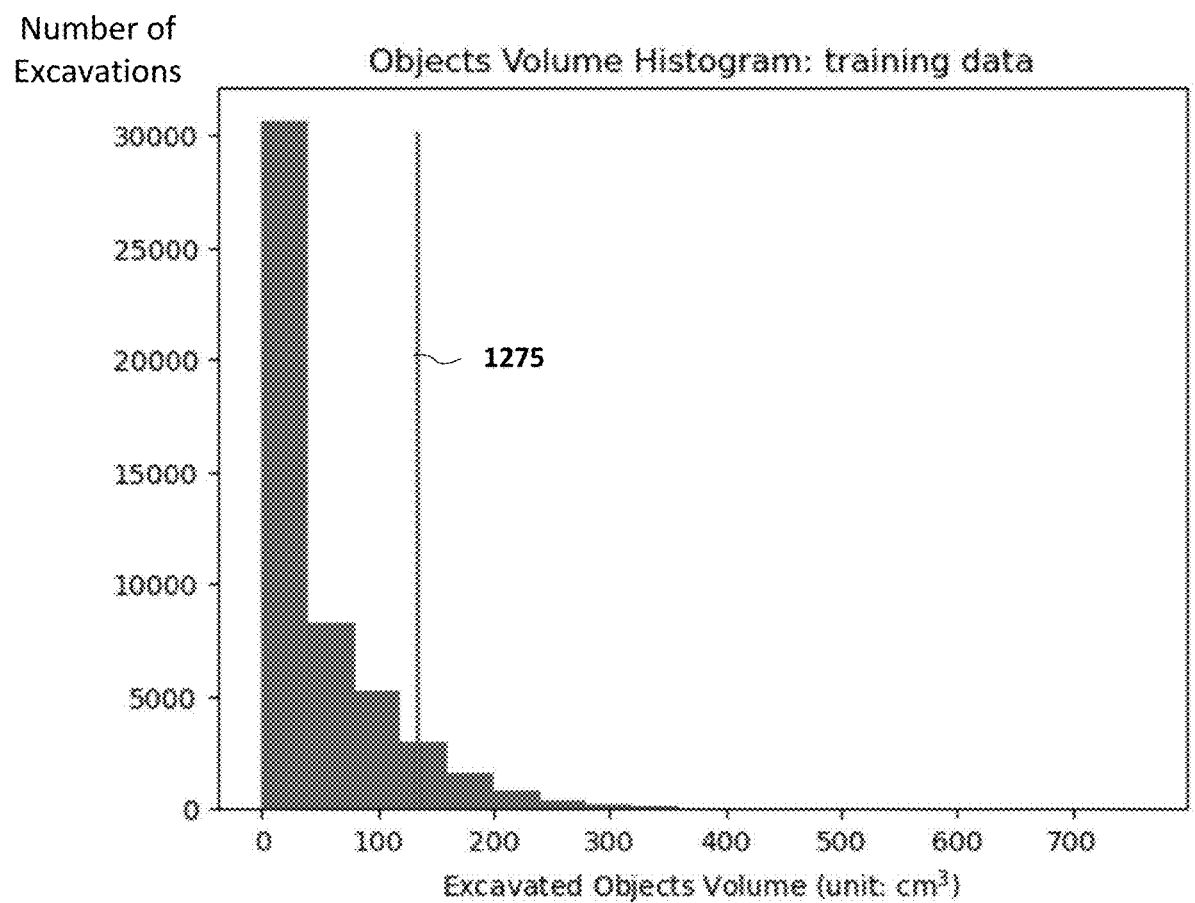
FIG. 12H depicts an excavation volume histogram of the training data in simulated experiments, according to embodiments of the present disclosure.
Figure 13A:
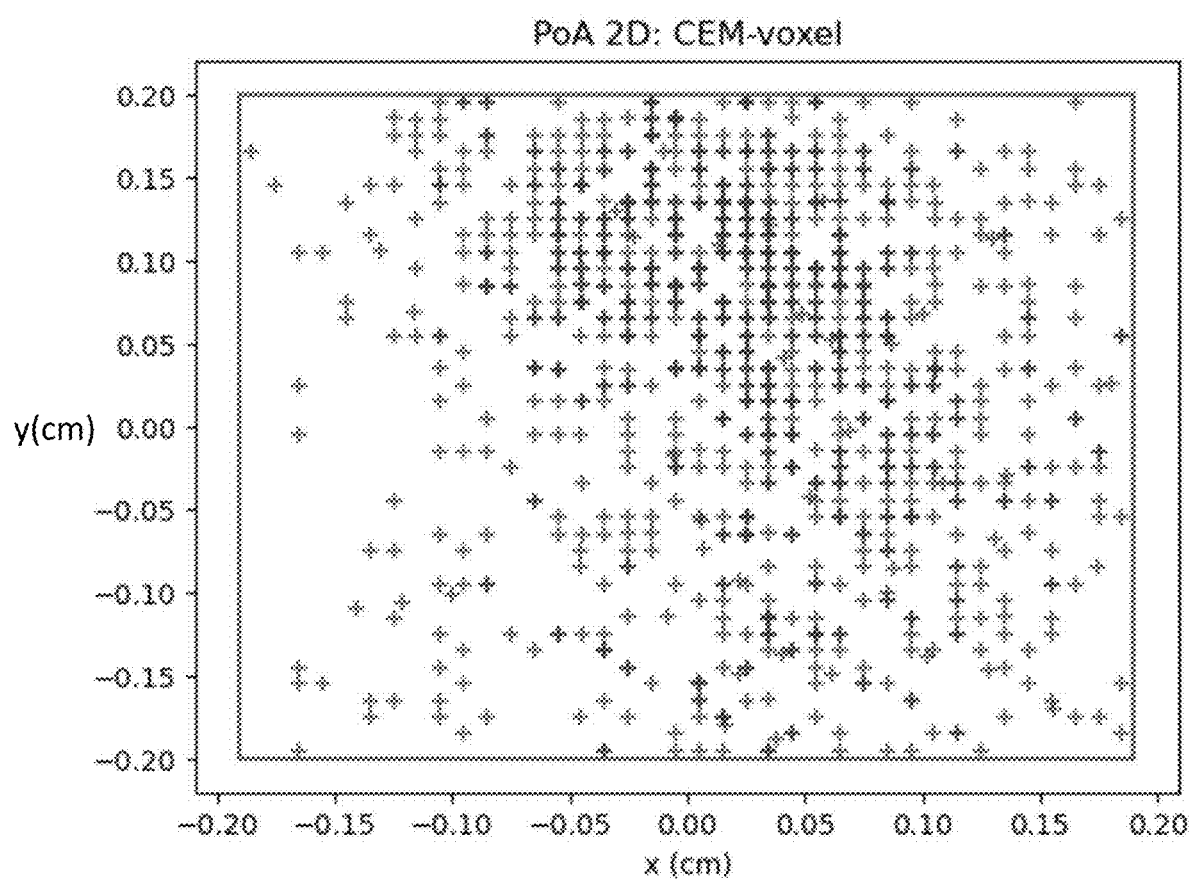
FIG. 13A depicts a point of attack (PoA) distribution of CEM-voxel in simulation, according to embodiments of the present disclosure.
Figure 13B:
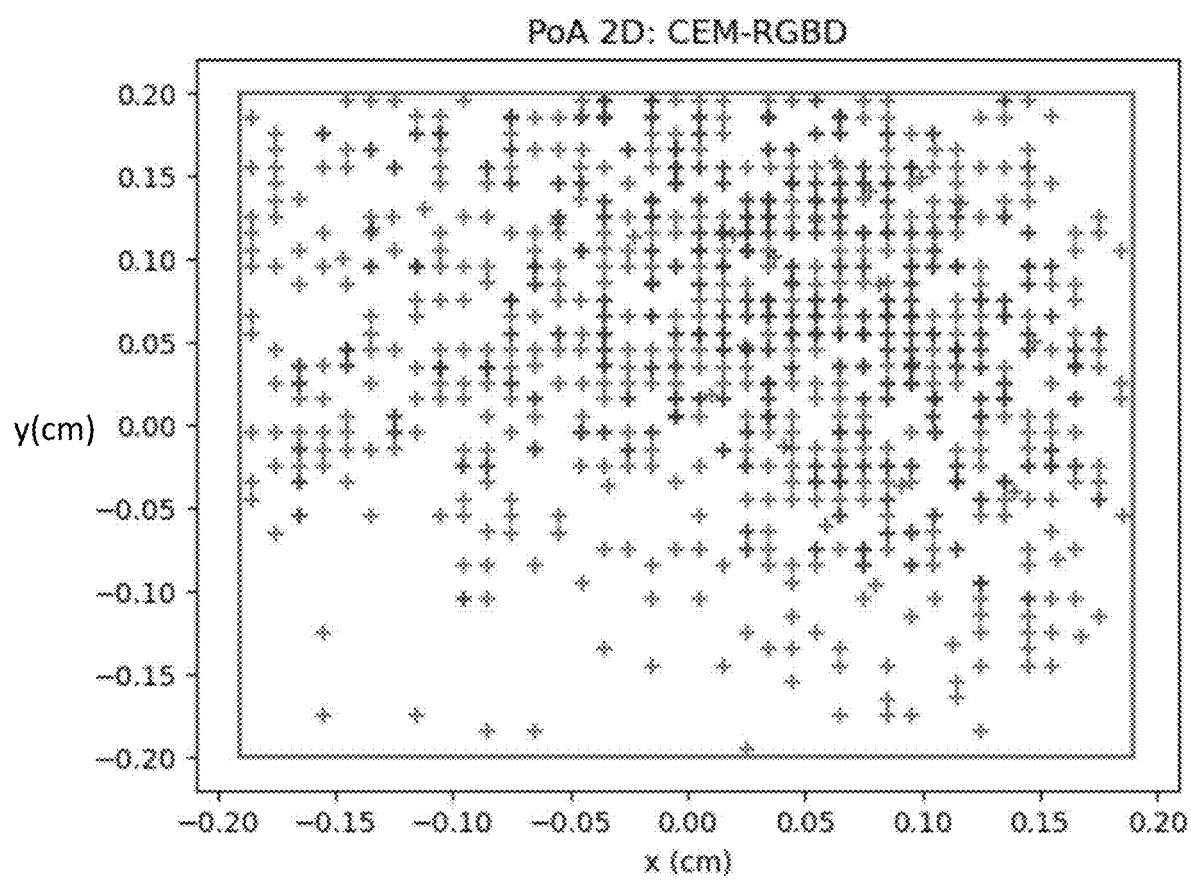
FIG. 13B depicts a PoA distribution of CEM-RGBD in simulation, according to embodiments of the present disclosure.
Figure 13C:
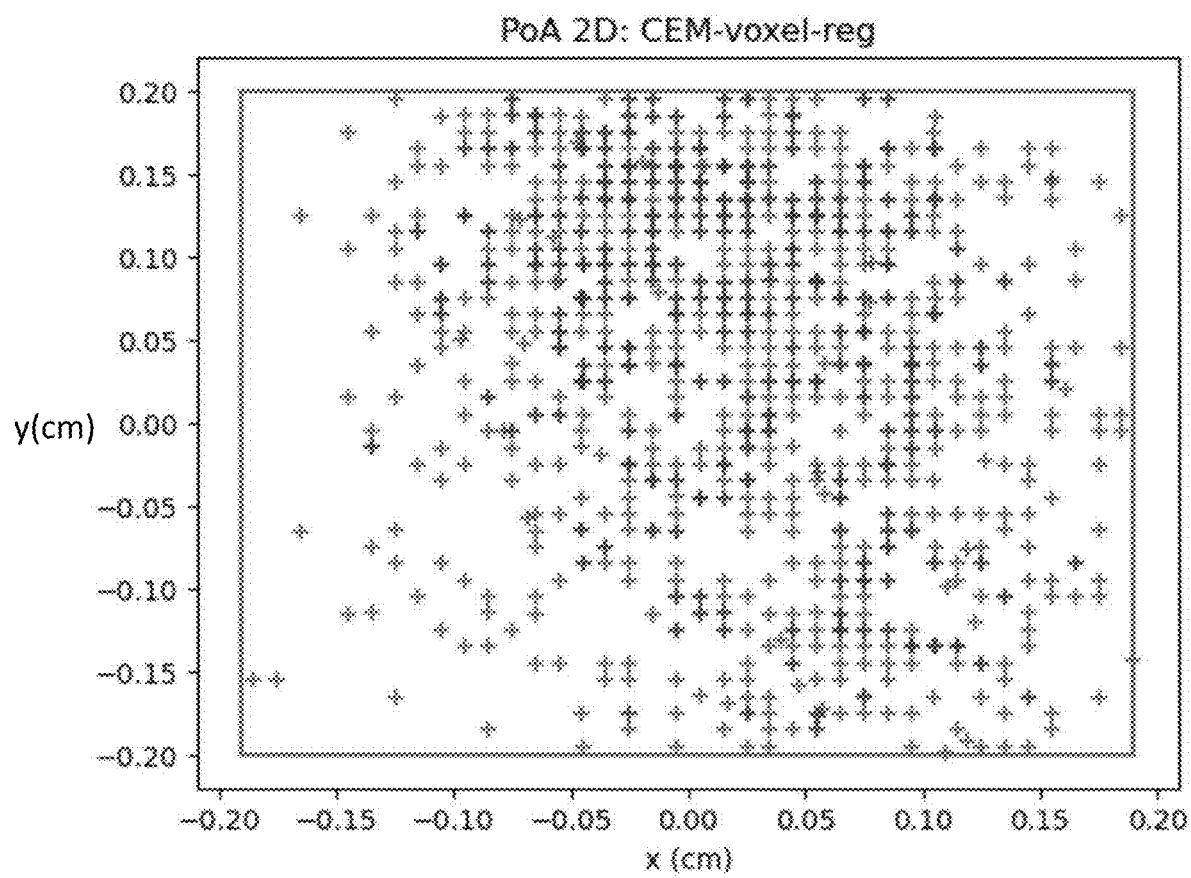
FIG. 13C depicts a PoA distribution of CEM-voxel-reg in simulation, according to embodiments of the present disclosure.
Figure 13D:
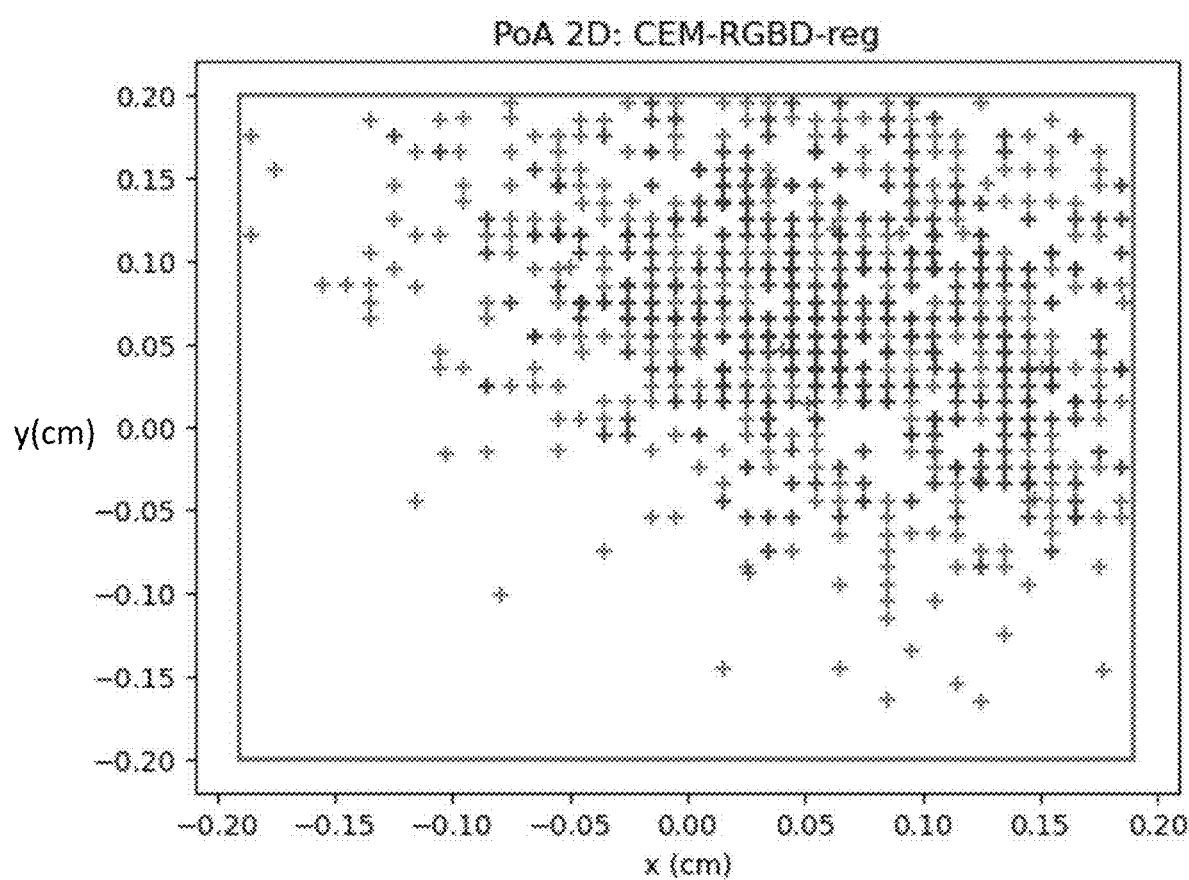
FIG. 13D depicts a PoA distribution of CEM-RGBD-reg in simulation, according to embodiments of the present disclosure.
Figure 13E:
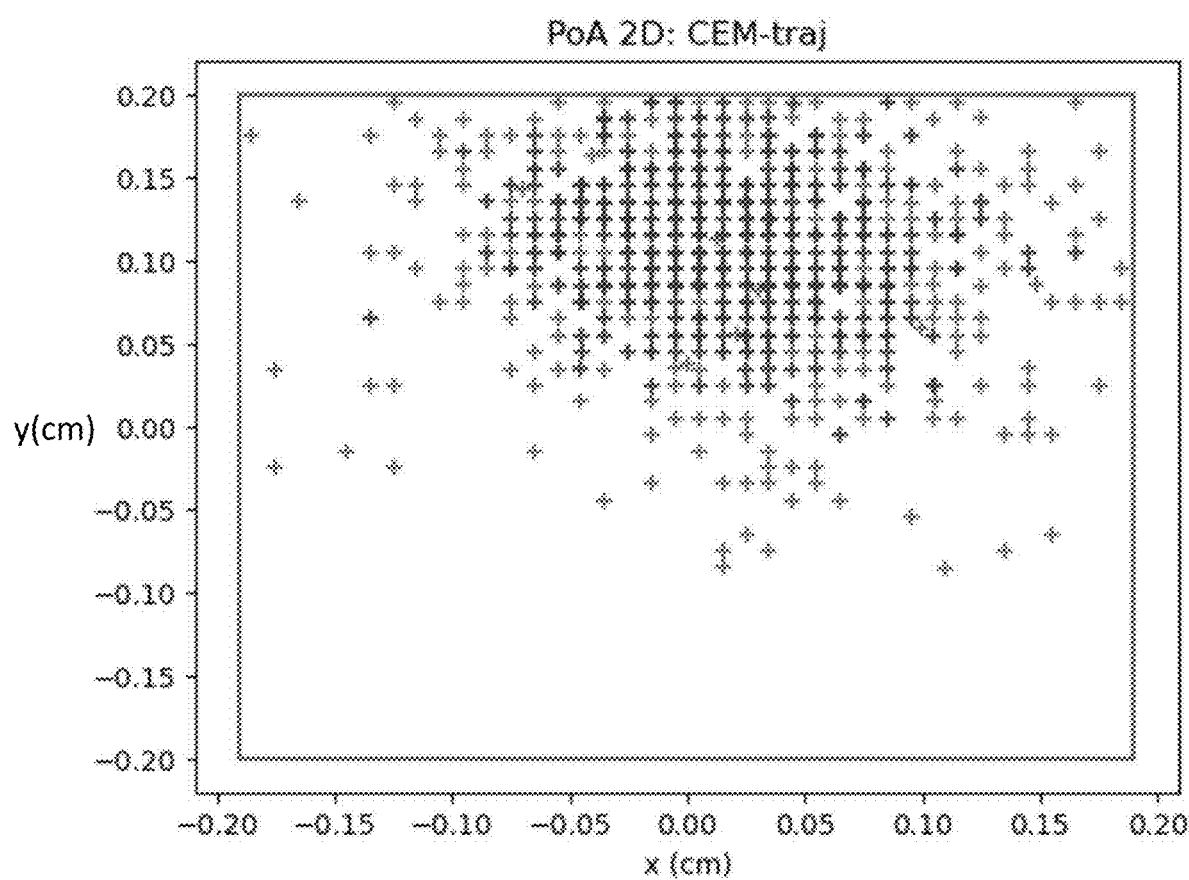
FIG. 13E depicts a PoA distribution of CEM-traj in simulation, according to embodiments of the present disclosure.
Figure 13F:
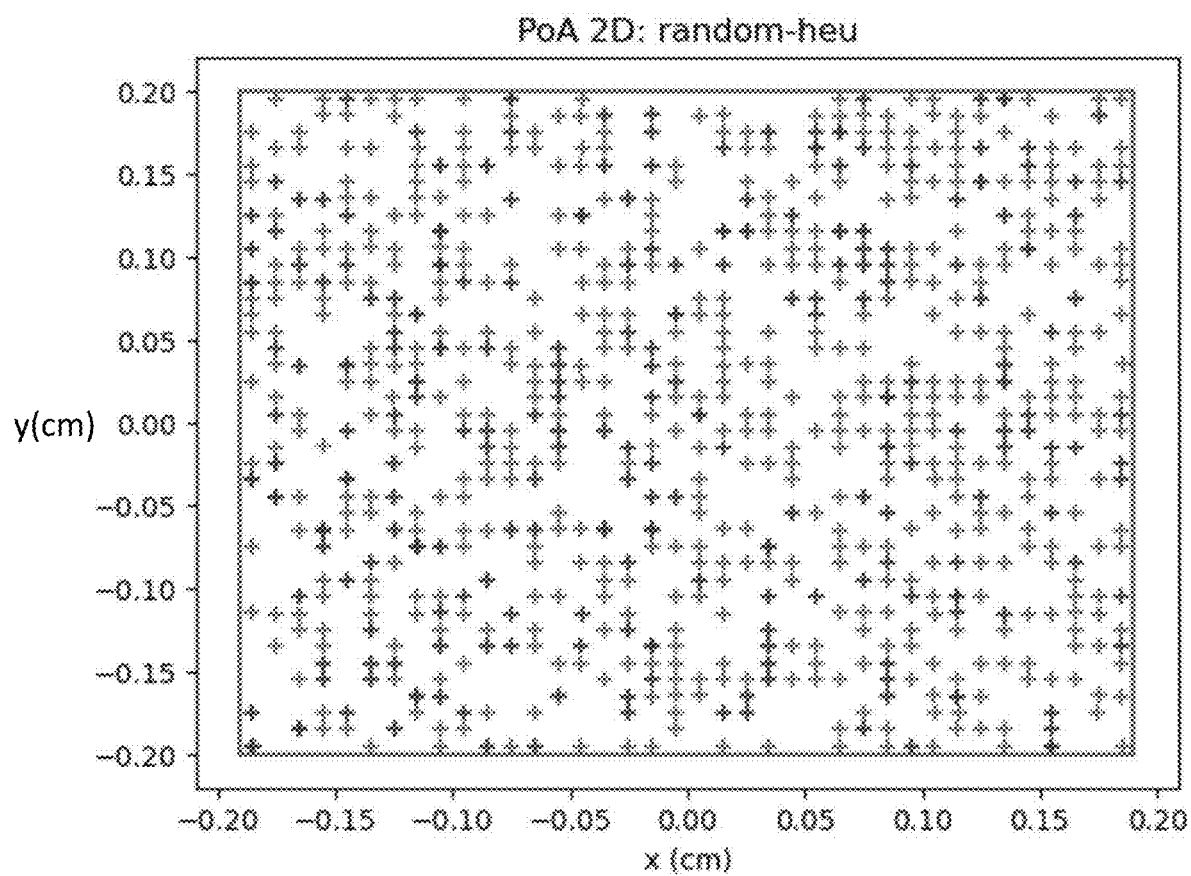
FIG. 13F depicts a PoA distribution of random-heu in simulation, according to embodiments of the present disclosure.
Figure 13G:
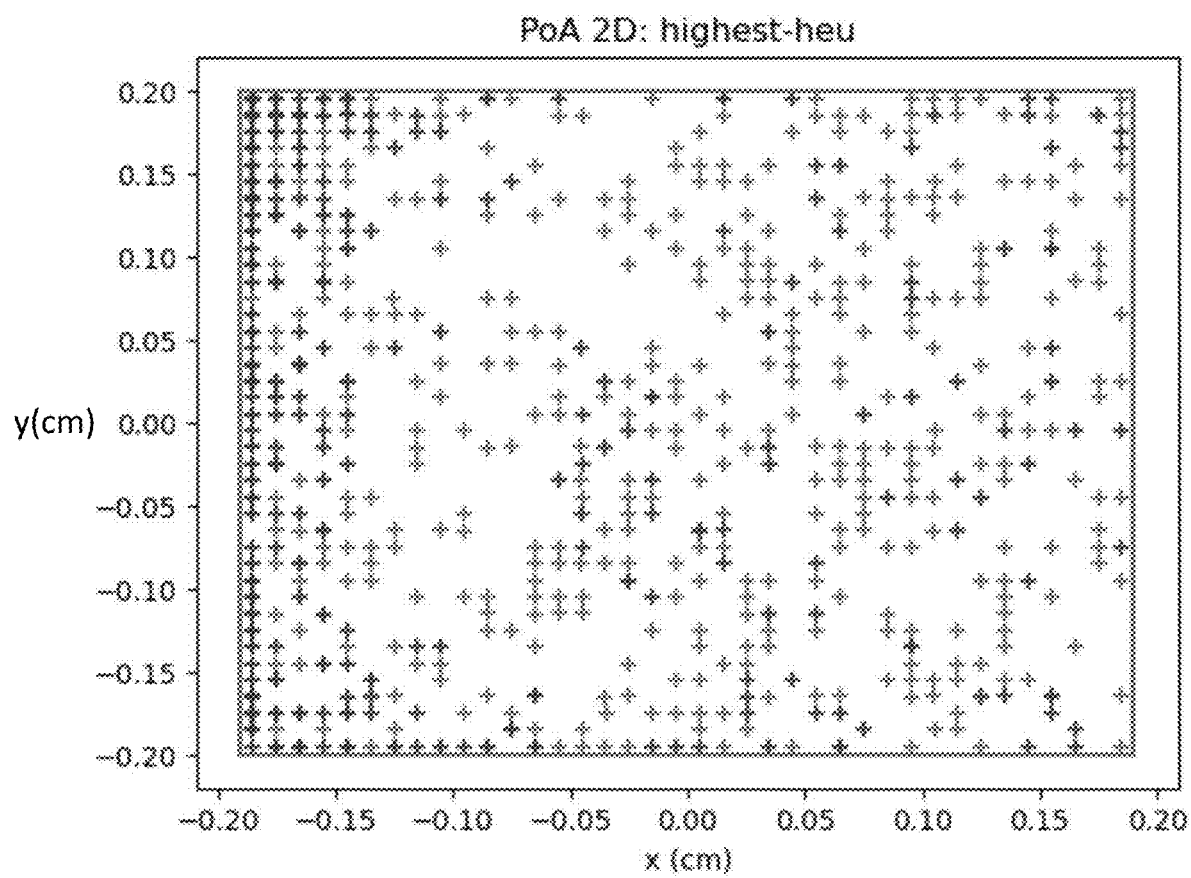
FIG. 13G depicts a PoA distribution of highest-heu in simulation, according to embodiments of the present disclosure.

The excavation volume histogram of the training data is plotted in FIG. 12H. An excavation is considered as a success if its excavation volume is above 134 $cm^3$ (i.e., 30% bucket filling rate). The vertical line 1275 in FIG. 12H shows where the excavation volume is 134 $cm^3$. With 134 $cm^3$ as the excavation success threshold, 4768 out of these 50,000 (10%) training samples are successful.

Since there are a lot of less successful training excavation samples than failure ones, the successful samples are over-sampled to overcome this class imbalance issue in the excavation training, as described in subsection F.4. Increasing the threshold to be larger than 134 $cm^3$ may lead to even less successful excavation training samples, which would make the excavation training harder due to more severe class imbalance. On the other hand, if the success threshold is decreased to be smaller than 134 $cm^3$, the learning-based planners would be more likely to generate excavation trajectories whose bucket filling rates are below 30%. This would hurt the excavation performance of the learning-based planners. Therefore, 134 $cm^3$ is chosen as a reasonable success threshold for excavation learning. Moreover, it is shown in subsection E.2 that classification-based CEM-voxel and CEM-RGBD outperforms regression-based CEM-voxel-reg and CEM-RGBD-reg respectively, which empirically justifies the choice of the excavation threshold.

7. Experimental Excavation Trajectory Analysis

The trajectory parameter mean and standard deviation of the 1000 simulated experimented excavations for each of the seven planners are presented in Table 4 and Table 5 respectively. FIGS. 13A-13G show the PoA distributions of the simulated experiment results of all seven planners. The coordinate origin is at the center of the tray in each PoA plot. The robot base locates at (x=−50, y=0) in the 2D tray frame.

TABLE 4

The trajectory means of different methods in simulated experiments

| Method | Trajectory Mean |
|---|---|
| CEM-voxel | [0.03, 0.04, −1.54, 0.12, 0.24, −2.56] |
| CEM-RGBD | [0.02, 0.05, −1.59, 0.13, 0.24, −2.79] |
| CEM-voxel-reg | [0.02, 0.04, −1.54, 0.13, 0.25, −2.51] |
| CEM-RGBD-reg | [0.06, 0.06, −1.52, 0.14, 0.26, −2.59] |
| CEM-traj-opt | [0.02, 0.1, −1.56, 0.14, 0.23, −2.54] |
| random-heu | [0, 0, −1.57, 0.12, 0.22-2.61] |
| highest-heu | [−0.06, 0.01, −1.59, 0.12, 0.23, −2.62] |

The GTP means and standard deviations of different planners are mostly similar, which shows learning-based planners generate excavation trajectories with large GTP diversity. The PoA standard deviations of the learning-based planners are smaller than heuristic planners due to the randomness of heuristic planners. In terms of the PoA mean, CEM-voxel, CEM-RGBD, and CEM-voxel-reg are similar and they are relatively different from CEM-RGBD-reg, CEM-traj-opt, random-heu, and highest-heu.

TABLE 5

The trajectory standard deviations of different methods in simulated experiments

| Method | Trajectory Mean |
|---|---|
| CEM-voxel | [0.07, 0.1, 0.34, 0.04, 0.1, 0.36] |
| CEM-RGBD | [0.09, 0.08, 0.33, 0.04, 0.11, 0.29] |
| CEM-voxel-reg | [0.07, 0.11, 0.32, 0.04, 0.1, 0.37] |
| CEM-RGBD-reg | [0.07, 0.07, 0.28, 0.04, 0.09, 0.26] |
| CEM-traj-opt | [0.06, 0.05, 0.36, 0.03, 0.10.37] |
| random-heu | [0.11, 0.11, 0.3, 0.04, 0.1, 0.31] |
| highest-heu | [0.12, 0.13,0.3, 0.04, 0.1, 0.3] |

As can be seen from both the trajectory means in Table 4 and the PoA distribution plots in FIG. 10, learning-based planners prefer to generate PoA in the top (i.e., positive y direction) right (i.e., positive x direction) area. Highest-heu generates a lot of PoA close to the left edge of the tray (i.e., x=−0.19 m). Objects tend to be pushed to the left wall of the tray during excavations. So highest points are more likely to occur close to the left wall of the tray.

Figure 14:
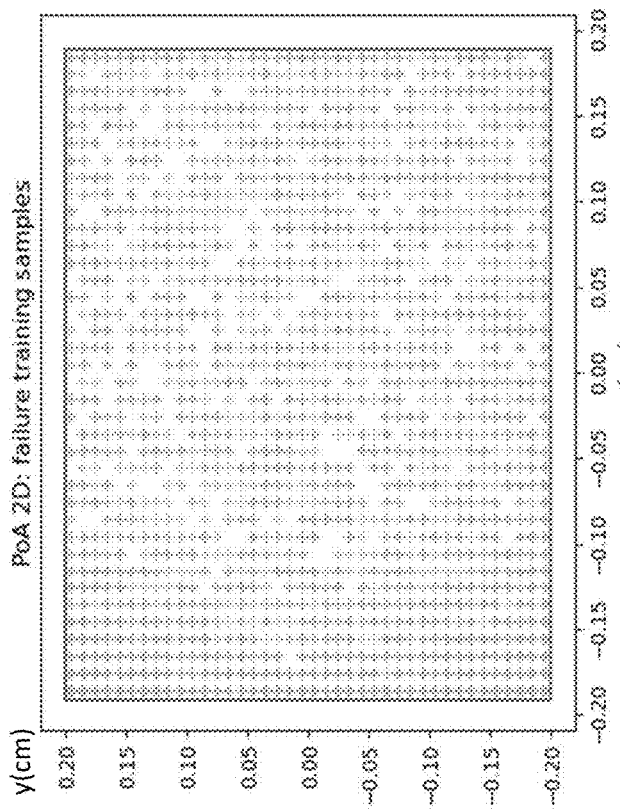
FIG. 14 depicts 2D PoA distributions of the training data in simulation, according to embodiments of the present disclosure.
Figure 14:
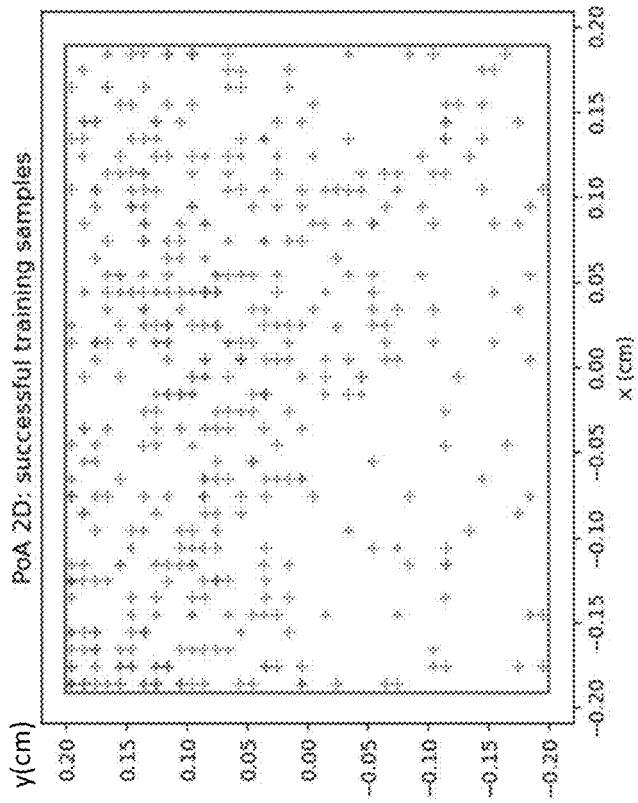

There are 5,000 randomly-selected excavation training excavation samples. The PoAs of the successful and failure excavations are plotted separately in FIG. 14. As described in subsection F.3, the training data contains half random-heu and half highest-heu excavations statistically. As shown in the PoA distribution of successful training samples in FIG. 14, there are more successful PoA in the top half of the tray, which explains the learning-based planners prefer PoA in the top area. The UR5 excavator swings around the swing center (x=−0.5 m, y=0.109 m) in the tray 2D coordinate. When the PoA gets closer to the bottom of the tray (i.e., y=0.2 m), the robot would have relatively less space to drag and close due to collision with the tray. Moreover, there are more failure excavations close to the left edge of the tray in the PoA distribution of successful training samples shown in FIG. 14 ("PoA distribution of failed training samples"), which pushes the learning-based planners to plan PoA away from the left edge.

It has been reported in subsection E.2 that learning-based scene-dependent planners such as CEM-voxel significantly outperform CEM-traj, which shows that it is important to learn to plan scene-dependent excavation trajectories using the visual representation of the excavation scene. However, the trajectory and PoA distributions may not reflect the benefits of the learning-based scene-dependent planning.

8. Ablation Experiments

Ablation experiments are performed to show insights on how the learning-based planners improve excavation for cluttered rigid objects. The ablation study is focused on the CEM-voxel planner, since it achieves the best excavation performance in the simulated and real-robot experiments. Two ablation experiments are performed by replacing the PoA and GTP of each CEM-voxel trajectory with random parameters respectively. Random PoA and GTP parameters are uniformly sampled from the same range as the heuristic planners introduced in subsection F.3. Using the same experiment setup and protocol as subsection E.1, 1000 excavation trials are experimented for both ablation experiments in simulation.

The excavation volumes, the excavated objects numbers, and the excavation success rates of both ablation experiments are presented in Table 6. The mean with standard deviation is listed in parentheses for excavation volumes and objects numbers. The original CEM-voxel experiment results in simulation are shown in Table 1. CEM-voxel with random PoA and random GTP both perform worse than the original CEM-voxel in terms of the three excavation metrics. This demonstrates CEM-voxel learns about how to generate both good PoA and GTP parameters for excavation. CEM-voxel with random PoA gets worse excavation performance than CEM-voxel with random GTP. This implies the learning of PoA matters more than the learning of GTP for CEM-voxel.

G. Some Conclusions

In the present patent document, multiple deep networks were presented for success prediction of a new task, rigid objects excavation in clutter. In one or more embodiments, excavation planning is modeled as an optimization problem leveraging the learned prediction models. Excavation experiments in simulation and in the real world show that embodiments of the learning-based planner are able to generate high-quality excavations. Experimental results also demonstrate the advantage of the learning-based excavation planner over two heuristic planners and one data-driven scene-independent planner.

In one or more embodiments, an excavation trajectory is planned greedily by maximizing the excavation volumes of the current excavation. Although excavation success rates for single excavation are utilized in one or more embodiments, long-term expected excavation reward of sequential excavations may also be considered for rigid objects excavation. Force control instead of position control may potentially be used to make the excavation trajectory execution smoother and more robust to large resistive forces. Embodiments of the presented learning-based planner may be utilized from robotic arms to real excavators.

H. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 15:
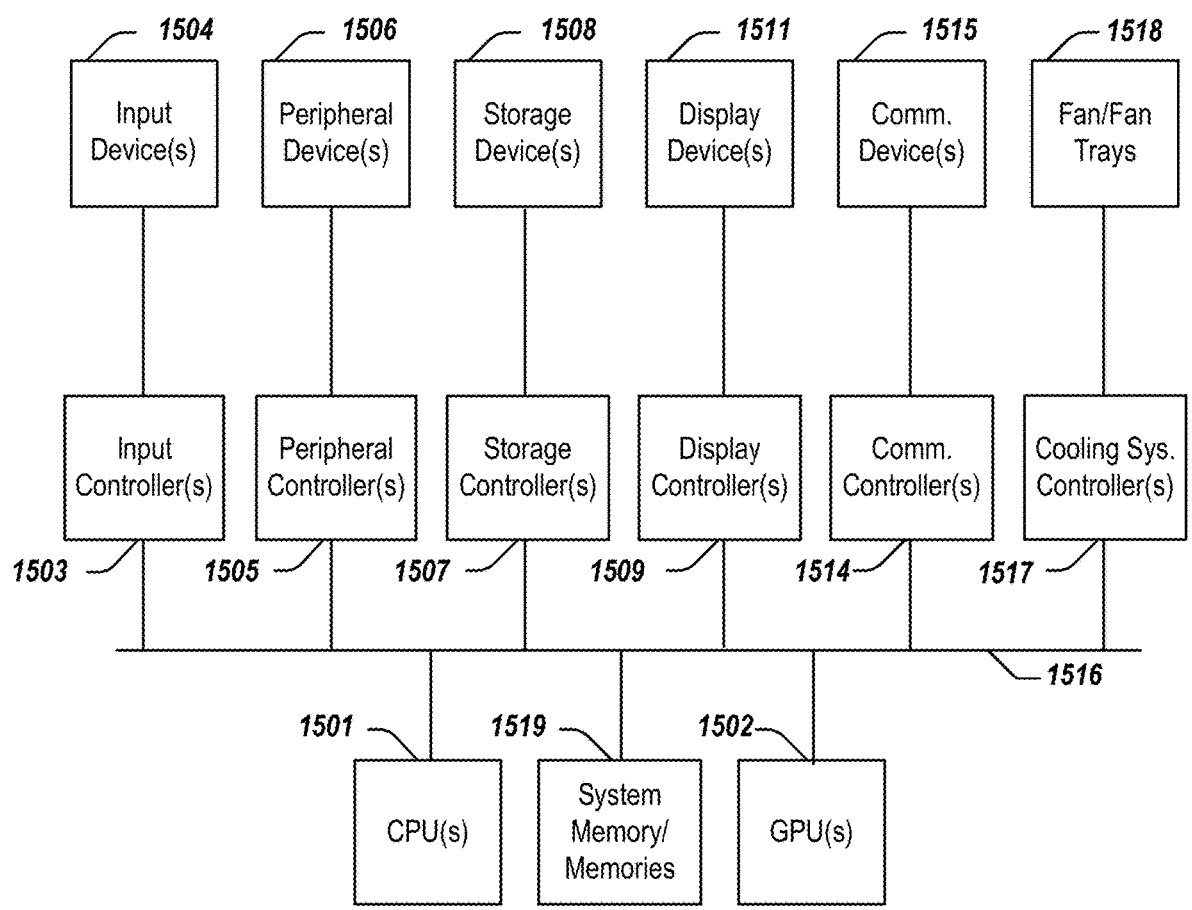
FIG. 15 depicts a simplified block diagram of a computing device/information handling system, according to embodiments of the present disclosure.

FIG. 15 depicts a simplified block diagram of an information handling system (or computing system), according to embodiments of the present disclosure. It will be understood that the functionalities shown for system 1500 may operate to support various embodiments of a computing system—although it shall be understood that a computing system may be differently configured and include different components, including having fewer or more components as depicted in FIG. 15.

As illustrated in FIG. 15, the computing system 1500 includes one or more CPUs 1501 that provides computing resources and controls the computer. CPU 1501 may be implemented with a microprocessor or the like, and may also include one or more graphics processing units (GPU) 1502 and/or a floating-point coprocessor for mathematical computations. In one or more embodiments, one or more GPUs 1502 may be incorporated within the display controller 1509, such as part of a graphics card or cards. The system 1500 may also include a system memory 1519, which may comprise RAM, ROM, or both.

A number of controllers and peripheral devices may also be provided, as shown in FIG. 15. An input controller 1503 represents an interface to various input device(s) 1504. The computing system 1500 may also include a storage controller 1507 for interfacing with one or more storage devices 1508 each of which includes a storage medium such as magnetic tape or disk, or an optical medium that might be used to record programs of instructions for operating systems, utilities, and applications, which may include embodiments of programs that implement various aspects of the present disclosure. Storage device(s) 1508 may also be used to store processed data or data to be processed in accordance with the disclosure. The system 1500 may also include a display controller 1509 for providing an interface to a display device 1511, which may be a cathode ray tube (CRT) display, a thin film transistor (TFT) display, organic light-emitting diode, electroluminescent panel, plasma panel, or any other type of display. The computing system 1500 may also include one or more peripheral controllers or interfaces 1505 for one or more peripherals 1506. Examples of peripherals may include one or more printers, scanners, input devices, output devices, sensors, and the like. A communications controller 1514 may interface with one or more communication devices 1515, which enables the system 1500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1500 comprises one or more fans or fan trays 1518 and a cooling subsystem controller or controllers 1517 that monitors thermal temperature(s) of the system 1500 (or components thereof) and operates the fans/fan trays 1518 to help regulate the temperature.

In the illustrated system, all major system components may connect to a bus 1516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for autonomous excavation learning comprising:
  tiling each parameter of an excavation trajectory, which is represented by multiple trajectory parameters, across a voxel-grid to obtain a tiled trajectory parameter voxel-grid for each parameter of the excavation trajectory;
  concatenating the tiled trajectory parameter voxel-grids with a voxel-grid representation of an excavation scene to generate an input voxel-grid of an excavation instance that defines a pair of the excavation trajectory and the voxel-grid representation of the excavation scene;
  feeding the input voxel-grid into a neural network to generate a multi-dimensional feature vector; and
  processing, using at least one fully-connected layer, the multi-dimensional feature vector to predict an excavation success probability.

2. The computer-implemented method of claim 1 wherein the multiple trajectory parameters comprise coordinates of a point of attack (PoA), an attacking excavation angle, a penetration depth, a closing angle, and a dragging length.

3. The computer-implemented method of claim 1 wherein the voxel-grid representation of the excavation scene is generated by steps comprising:
  transforming a pointcloud of an excavation scene, obtained from an RGB-Depth camera, into an excavation region frame;
  filtering the transformed pointcloud into a filtered pointcloud to correspond to a size of a specific excavation cuboid space; and
  voxelizing the filtered pointcloud to generate the voxel-grid representation of the excavation scene.

4. The computer-implemented method of claim 1 wherein the neural network is a three dimensional (3D) convolutional neural network (CNN) comprising multiple 3D convolution filters.

5. The computer-implemented method of claim 1 wherein the excavation scene comprises one or more rigid objects that are not deformable during excavation.

6. The computer-implemented method of claim 1 wherein the at least one fully-connected layer is followed by a sigmoid output layer.

7. The computer-implemented method of claim 1 wherein the at least one fully-connected layer is followed by an additional fully-connected layer for a regression model for excavation prediction.

8. The computer-implemented method of claim 1 wherein the excavation trajectory is one of multiple heuristic excavation trajectories that are generated using an excavation planner to initialize a distribution of trajectory parameters.

9. The computer-implemented method of claim 8 further comprising:
- updating the distribution through multiple iterations of excavation trajectory sampling and excavation trajectory selecting in terms of a predicted excavation success probability for each sampled excavation trajectory;
- sampling, from the distribution at the last iteration, a subset of excavation trajectories for evaluation; and
- choosing, from the subset of excavation trajectories, one excavation trajectory with the highest predicted excavation success probability as a planned excavation trajectory.

10. A system for autonomous excavation learning and planning comprising:
- one or more processors; and
- a non-transitory computer-readable medium or media comprising one or more sets of instructions which, when executed by at least one of the one or more processors, causes steps to be performed comprising:
  - tiling each parameter of an excavation trajectory, which is represented by multiple trajectory parameters, across a voxel-grid to obtain a tiled trajectory parameter voxel-grids for each parameter of the excavation trajectory;
  - concatenating the tiled trajectory parameter voxel-grids with a voxel-grid representation of an excavation scene to generate an input voxel-grid of an excavation instance that comprises the excavation trajectory and the voxel-grid representation of the excavation scene;
  - feeding the input voxel-grid into a neural network to generate a multi-dimensional feature vector; and
  - processing, using one or more fully-connected layers, the multi-dimensional feature vector to predict an excavation success probability.

11. The system of claim 10 wherein the voxel-grid representation of the excavation scene is generated by steps comprising:
- transforming a pointcloud of an excavation scene, obtained from an RGB-Depth camera, into an excavation region frame;
- filtering the transformed pointcloud into a filtered pointcloud to correspond to a size of a specific excavation cuboid space; and
- voxelizing the filtered pointcloud to generate the voxel-grid representation of the excavation scene.

12. The system of claim 10 wherein the multiple trajectory parameters comprise coordinates of a point of attack (PoA), an attacking excavation angle, a penetration depth, a closing angle, and a dragging length.

13. The system of claim 10 wherein the neural network is a three dimensional (3D) convolutional neural network (CNN) comprising multiple 3D convolution filters.

14. A computer-implemented method for excavation planning comprising:
- generating, using an excavation planner, multiple excavation trajectories given a voxel-grid representation of an excavation scene to initialize a distribution of trajectory parameters, each excavation trajectory is presented by multiple trajectory parameters;
- updating the distribution through multiple iterations of sampling excavation trajectories and selecting a set of excavation trajectories from the sampled excavation trajectory using predicted excavation success probabilities for the sampled excavation trajectories that were predicted by an excavation prediction model by performing, for each sampled excavation trajectory, steps comprising:
  - tiling each parameter of the sampled excavation trajectory across a voxel-grid to obtain a tiled trajectory parameter voxel-grid corresponding to the parameter;
  - concatenating the tiled trajectory parameter voxel-grids with the voxel-grid representation of the excavation scene to generate an input voxel-grid of an excavation instance that comprises the sampled excavation trajectory and the voxel-grid representation of the excavation scene;
  - feeding the input voxel-grid into a neural network to generate a multi-dimensional feature vector; and
  - processing, using one or more fully-connected layers, the multi-dimensional feature vector to output the predicted excavation success probability;
- sampling, from the distribution at the last iteration, a subset of excavation trajectories; and
- choosing, from a subset of excavation trajectories, one excavation trajectory with the highest predicted success probability as a planned excavation trajectory.

15. The computer-implemented method of claim 14 wherein the multiple trajectory parameters comprise coordinates of a point of attack (PoA), an attacking excavation angle, a penetration depth, a closing angle, and a dragging length.

16. The computer-implemented method of claim 14 wherein the neural network is a three dimensional (3D) convolutional neural network (CNN) comprising multiple 3D convolution filters.

17. The computer-implemented method of claim 14 wherein the one or more fully-connected layers is followed by a sigmoid output layer for processing the multi-dimensional feature vector.

18. The computer-implemented method of claim 15 wherein the multiple excavation trajectories are heuristic excavation trajectories.

19. The computer-implemented method of claim 14 wherein the excavation trajectory represents a three-dimensional trajectory.

* * * * *